United States Patent
Henderson

(10) Patent No.: US 8,160,221 B2
(45) Date of Patent: *Apr. 17, 2012

(54) CELLULAR TELEPHONE WITH THE ABILITY TO DISPLAY AND STORE PICTURE AND VIDEO MESSAGES AND CALLER ID RECEIVED FROM A MESSAGE ORIGINATOR

(76) Inventor: Daniel A. Henderson, Fort Worth, TX (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/380,320

(22) Filed: Feb. 26, 2009

(65) Prior Publication Data

US 2009/0163191 A1    Jun. 25, 2009

Related U.S. Application Data

(60) Continuation of application No. 11/059,121, filed on Feb. 16, 2005, now abandoned, which is a division of application No. 10/033,824, filed on Dec. 19, 2001, now Pat. No. 7,266,186, which is a continuation of application No. 08/726,024, filed on Oct. 4, 1996, now Pat. No. 7,426,264, and a continuation-in-part of application No. 08/177,851, filed on Jan. 5, 1994, now Pat. No. 6,278,862.

(60) Provisional application No. 60/005,029, filed on Oct. 6, 1995.

(51) Int. Cl.
*H04M 1/56* (2006.01)

(52) U.S. Cl. .............. 379/142.04; 455/466; 455/415

(58) Field of Classification Search .......... 455/466, 455/415; 379/67.1, 68, 88.11, 88.13, 88.12, 379/88.19, 142.04, 142.05, 142.06
See application file for complete search history.

(56) References Cited

U.S. PATENT DOCUMENTS

| | | | |
|---|---|---|---|
| 4,715,059 A | 12/1987 | Cooper-Hart et al. | |
| 4,805,094 A | 2/1989 | Oye | |
| 4,924,480 A | 5/1990 | Gay | |
| 4,994,797 A * | 2/1991 | Breeden | 340/7.28 |
| 5,023,905 A * | 6/1991 | Wells et al. | 379/93.17 |
| 5,117,449 A * | 5/1992 | Metroka et al. | 455/552.1 |
| 5,148,485 A | 9/1992 | Dent | |
| 5,412,708 A | 5/1995 | Katz | |
| 5,418,529 A * | 5/1995 | De Luigi et al. | 340/7.52 |
| 5,426,594 A * | 6/1995 | Wright et al. | 709/206 |
| 5,430,439 A * | 7/1995 | Bodet et al. | 340/7.52 |
| 5,446,678 A * | 8/1995 | Saltzstein et al. | 709/246 |
| 5,452,356 A | 9/1995 | Albert | |
| 5,481,255 A | 1/1996 | Albert | |

(Continued)

FOREIGN PATENT DOCUMENTS

EP    0436345    12/1990

(Continued)

OTHER PUBLICATIONS

From Sharp Minds Come Sharp Products, Jul. 1993.

(Continued)

*Primary Examiner* — Olisa Anwah
(74) *Attorney, Agent, or Firm* — Robert K. Tendler

(57) ABSTRACT

A cellular telephone receives a wireless signal containing Caller ID and a picture or video message. The picture or video message may be encrypted, compressed or encoded. The received Caller ID may be used to establish the identity of the originator of the picture or video message.

39 Claims, 9 Drawing Sheets

U.S. PATENT DOCUMENTS

| | | | | |
|---|---|---|---|---|
| 5,483,595 | A * | 1/1996 | Owen | 380/271 |
| 5,666,159 | A | 9/1997 | Parulski et al. | |
| 5,764,731 | A | 6/1998 | Yablon | |
| 6,002,719 | A * | 12/1999 | Parvulescu et al. | 375/240 |
| 7,197,324 | B2 * | 3/2007 | Sweeney | 455/466 |
| 7,257,564 | B2 * | 8/2007 | Loughmiller et al. | 706/16 |
| 7,290,033 | B1 * | 10/2007 | Goldman et al. | 709/206 |
| 7,729,301 | B2 * | 6/2010 | Salmi | 370/310 |
| 7,738,886 | B1 * | 6/2010 | Connolly et al. | 455/461 |
| 8,031,060 | B2 * | 10/2011 | Hoffberg et al. | 340/426.16 |
| 2005/0020289 | A1 * | 1/2005 | Kim et al. | 455/466 |
| 2005/0193072 | A1 * | 9/2005 | Chant et al. | 709/206 |
| 2006/0135132 | A1 * | 6/2006 | Cai et al. | 455/414.1 |
| 2006/0242245 | A1 * | 10/2006 | Christensen | 709/206 |
| 2008/0268883 | A1 * | 10/2008 | Shim | 455/466 |
| 2010/0138365 | A1 * | 6/2010 | Hirvela et al. | 706/12 |

FOREIGN PATENT DOCUMENTS

| | | |
|---|---|---|
| EP | 0436345 | 7/1991 |
| EP | 0411385 | 8/1991 |
| EP | 0441385 | 8/1991 |
| JP | 62212792 | 9/1987 |
| JP | 2046028 | 2/1990 |
| JP | 3273718 | 12/1991 |
| JP | 5130253 | 5/1993 |
| WO | WO9209178 | 5/1992 |

OTHER PUBLICATIONS

Cosmic Communicator: it's not pie-in-the-sky anymore, Jul. 1993.
Now, You Can Design, date unknown, copyright 1994, Mitsubishi Electronics America, Inc., Electronic Device Group.
Litigation File, *Intellect Wireless Inc v. HTC Corporation, HTC America, Inc., Research in Motion Limited and AT&T Mobility LLC*, Civil Action No. 09 C 2945, Northern District of Illinois. Eastern Division.
Further Litigation file *Intellect Wireless Inc v. HTC Corporation, HTC America, Inc., Research in Motion Limited and AT&T Mobility LLC*, Civil Action No. 09 C 2945, Northern District of Illinois, Eastern Division, including Summary Judgement Motion and Response.
Chien, et al. "Cellular Access Digital Network (CADN): Wireless Access to Networks of the Future." IEEE Communications Magazine, vol. 25, No. 6 Jun. 1987. pp. 22-31. (priorly provided).
Control No. 95/001,777 Order Granting Request.
Control No. 95/001,777 Non-Final Office Action.
Control No. 95/001,777 Response.
Control No. 90/012,072 Request.
Control No. 90/012,072 Office Action.
Control No. 95/001,814 Request.
Control No. 95/001,814 Order and Office Action.
Control No. 95/001,814 Response.
HP 95LX User's Guide, Edition 6. Apr. 1992.

* cited by examiner

CELLULAR TELEPHONE WITH THE ABILITY TO DISPLAY AND STORE PICTURE AND VIDEO MESSAGES AND CALLER ID RECEIVED FROM A MESSAGE ORIGINATOR

RELATED APPLICATIONS

This application is a continuation of U.S. patent application Ser. No. 11/059,121 filed Feb. 16, 2005, now abandoned, which is a division of U.S. patent application Ser. No. 10/033,824 filed Dec. 19, 2001, now U.S. Pat. No. 7,266,186 which is a continuation of U.S. patent application Ser. No. 08/726,024 filed Oct. 4, 1996, now U.S. Pat. No. 7,426,264 which claims rights under 35USC119 to Provisional Patent Application 60/005,029 filed Oct. 6, 1995, and is a continuation-in-part of U.S. patent application Ser. No. 08/177,851 filed Jan. 5, 1994, now U.S. Pat. No. 6,278,862 the contents of which are incorporated herein by reference.

FIELD OF THE INVENTION

This invention relates to wireless devices and more particularly to the ability to eliminate the display of unwanted picture and video images.

BACKGROUND OF THE INVENTION

With the advent of wireless devices and more particularly advanced cellular phones, laptop computers, PDAs and wireless picture frames, there is a necessity to prevent unwanted wireless video and picture images from being displayed. These video images for instance can be from unknown sources or can contain objectionable material such as advertising or pornographic material. Access via wireless links to various devices that can display such images permits access to these devices from websites, cellular phones, cameras, computers or computer tablets including PDAs which information is pushed from these devices to the particular wireless device. In today's parlance these unwanted messages are called spam.

These unwanted messages and data are described by the inventor hereof in his prior patents and patent applications. In co-pending application Ser. No. 11/134,669 filed May 19, 2005, claiming rights under 35USC119 to Provisional Application Ser. No. 60/005,029 filed Oct. 6, 1995, as early as 1995 the ability to selectively display picture data based on the identity of the entity transmitting the data is described. The entity transmitting the data, i.e. the message originator, is identified either alphanumerically as by a telephone number or by other identifying means such as e-mail addresses, device serial numbers and websites.

It is noted that in this patent application Caller ID is utilized to identify the message originator noting that while the above noted application was primarily presented in a paging or cellular environment, the identity of the calling party along with any optional data message such as a voice, text or image message were to be received by the called party's personal communicator.

In the present context the called party's personal communicator is a wireless phone, PDA, wireless picture frame, computer or other device which obtains the picture and video image wirelessly.

Clearly identified in this patent application were the existence of telephone numbers, e-mail addresses or the like to provide message originator identity.

Note that in this prior patent application, the recipient could determine in advance at a message center or from within the wireless device which message originators they wish to receive wireless picture or video messages from. Any message originators not having the identity that matches the pre-stored preferences at the message center or from within the wireless device would not be able to cause a signal to be transmitted or displayed.

In the context of the subject invention, if the signal is not transmitted or transmittable then the unwanted message is not displayed.

Note in the above patent application that e-mail information received at a message center could be used alternatively as caller identifying information, with description in this application summarizing one embodiment of this concept.

Key to the ability to eliminate unwanted wireless picture and video in this early patent application is the coincidence detection within a message center in which picture and video data could be selectively transmitted to the message recipient based on a comparator at the message center that analyzes the source identity of the message originator with pre-stored user preferences determined in advance by the message recipient.

Moreover, coincidence detection was said to be available within a wireless portable communication device in which data representative of the identity of the message originator could be used at the portable communication device of the message recipient. In this case the wireless portable communication device would employ a coincidence detector that generates a number of notification events in response to a match with pre-stored data or user preferences compared against the caller identity data received. It is said in this patent application that a coincidence detection could inhibit any associated message transmitted from a message center from being reviewed by the message recipient at the personal communicator device.

What is therefore eminently understandable is that as early as 1995 the patent application from which this application derives its early filing date described what is now known as spam filtering in wireless devices, especially as it relates to video and picture images.

With the advent of disparate personal communication devices such as wireless picture frames which are viewable by many, or in fact by the transmission of videos and picture images to wireless phones, it is important that the user of the wireless phone be able to eliminate unwanted pictures and video. It is also important to be able to provide a mechanism by which someone in authority can limit, for instance the transmission of pornographic information to selected recipients, which pornographic or advertising information can be generated from those unknown to the recipient, such as from websites and from spammers who broadcast the offensive material to all of the cell phone numbers that they can identify.

Additionally, the dissemination of sexually explicit materials, now called "sexting" has reached proportions which are alarming to parents and authorities who wish to protect children from the harmful effects of pornographic information being transmitted to their individual wireless devices. Additionally, adults may not wish to have this offensive or objectionable material sent to their devices both because it is unwanted in the sense of its content, and also because it is unwanted due to the frequency with which such picture and video messages are sent out. Thirdly, these images can constitute unwanted advertising.

Thus, with the advent of picture messaging there has been an increase in social problems related to this application, meaning that the sending of certain pictures and video has resulted in unwanted receipt of images by the recipient.

Taking for example a wireless picture frame that one wants to send a picture to, one has to have a device capable of sending a picture. That transmission that is ultimately sent or intended to be sent to the wireless picture frame of necessity includes at least two components. It will include the picture data itself and it will include some alphanumeric textual identifier that is typically either the phone number used or associated with the message originator, or an e-mail address that may or may not include phone number information. Moreover, it might be other information such as a website address or in fact the number associated with the device used in transmitting the images.

SUMMARY OF INVENTION

It is the purpose of the subject invention to take information that is associated with the picture or video image that identifies the message originator and to utilize this information to inhibit the display of picture or video image at the wireless communication device. In one embodiment inhibiting image display includes coincidence detection that may be contained within the wireless communication device, or can be used at a message center within the wireless network or elsewhere to inhibit unwanted images from being displayed on the wireless communication device.

As will be appreciated, coincidence detection can rely on rules that are established by the message recipient, either at his or her communication device or at a message center itself. Thus either at the wireless communication device or at the message center, it is the textual data associated with the picture or video data that is detected and is matched with pre-stored user preference data, which is in one embodiment a listing of undesirable message originators. When coincidence is detected then a transmission to the wireless communication device or display at the wireless communication device is selectively inhibited.

There are two types of systems in which picture and video messages are transmitted wirelessly to a wireless device. The first uses a network which includes a message center that stores the picture or video message data and transmits it to the wireless communication device. Even in the case of streaming technologies, message centers operate as a buffer for the video or picture information.

On the other hand, it is possible to store the video or picture information in a computer and transmit it from the message originating computer to the wireless handset without going through a server. This includes Bluetooth systems and infrared systems which involve point-to-point communication.

Regardless of whether there is a message center or server involved, the picture and video images are tagged or associated in some manner with the message originator information.

Thus, if one can identify the source of the video or picture image one can inhibit it from being displayable at the wireless communication device. Such identity can be ascertained before the device displays the image by comparing the identification information with a preloaded list of acceptable message originators or alternatively a preloaded list of prohibited message originators.

In the case that a message center is employed, this message center can be a multimedia service message center or MMS message center, as described more fully in the 3GPP MMS Multimedia Messaging Service G. W. E Naël, Le Bodic, John Wiley & Sons LTD, 2003, incorporated herein by reference.

The MMS message center need not necessarily be on the wireless network, but can be for instance a Master MMS center at for instance a person's home or business which is then utilized to distribute via Bluetooth or 802.11 wireless communication the received image to various Slave devices that include wireless picture frames. Thus, one could for instance, at a given locale, have Master multimedia router or distributor at which the spam filtering provided by the subject invention can be housed. Thus, the Master multimedia device, which can display the images itself, can provide the inhibiting function, not only to the display of the images it receives, but also to inhibit images from being distributed.

Additionally, it is a feature of the subject invention that when the picture or picture message has no associated source identification information then either no picture messages are sent to the wireless device, or if sent, the wireless device is inhibited from displaying such picture or picture message.

In summary, unwanted picture or video images are inhibited from being displayed by wireless communication devices based on the identity of the message originator, be that identity a phone number, an e-mail address, a website, a blocked message originator identification signal, the absence of a message originator identifier associated with the wireless picture message, or an electronic serial number of the message originator's device.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
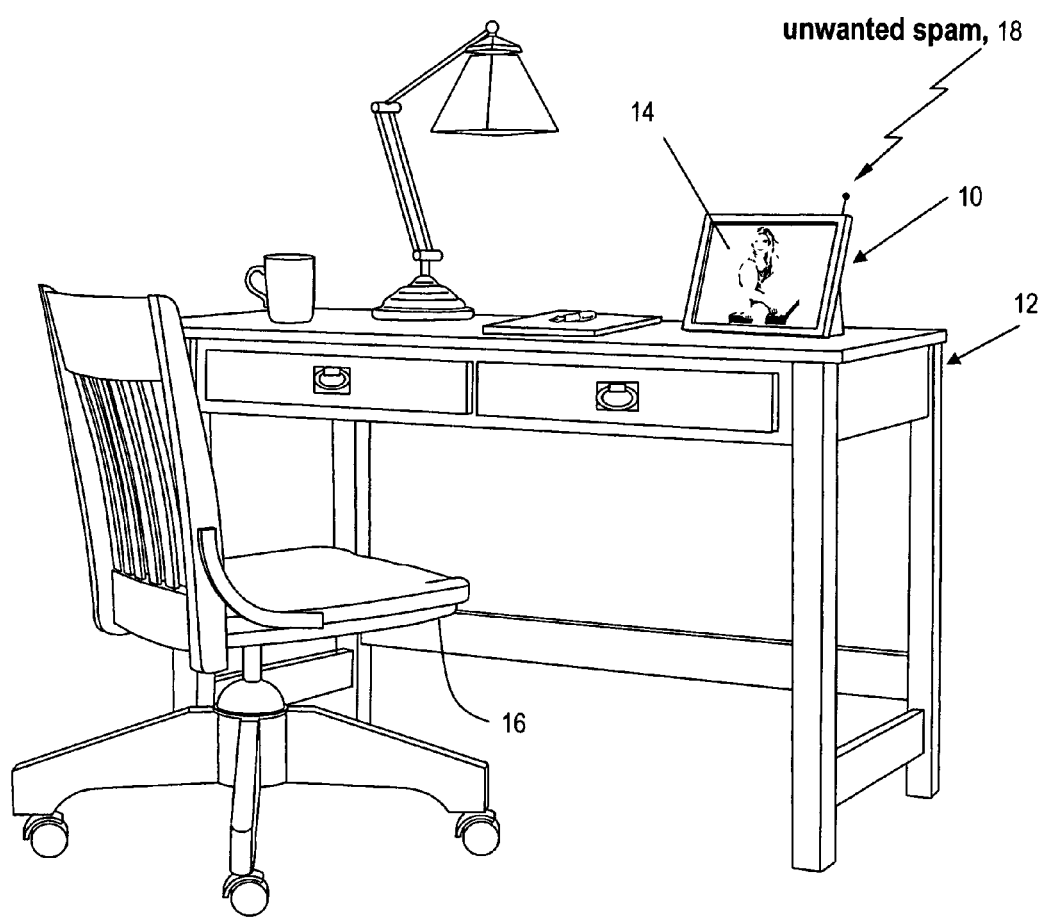
FIG. 1 is a diagrammatic illustration of the use of a wireless picture frame at an individual's desk indicating the receipt of an unwanted spam image at the picture frame.

Referring now to FIG. 1, a wireless picture frame 10 is shown on a desk 12 such that an image 14 is readily viewable by a person in a chair 16, or in fact by any one in the vicinity of the desk. In this case the screen displays unwanted spam which may be pornographic or otherwise undesirable. Note that having such pictures on a wireless picture frame may be embarrassing or offensive, or may pose other legal problems such as sexual harassment in a work environment.

Most notably wireless picture frames are susceptible to addressing by spammers in which unwanted spam 18 is transmitted to the wireless picture frame whereupon without control of the message recipient the image is displayed, much to the annoyance and/or embarrassment of the individual owning the picture frame.

While the subject system is described in connection with wireless picture frames, it will be appreciated that the receipt of unwanted picture or video images on any kind of device such as a wireless phone, PDA or the like can be both embarrassing and undesirable. Since the owner of such a device has no control over what is displayed on his device, such spamming is all the more objectionable.

There therefore needs to be a simple system under the control of the message recipient to limit or inhibit unwanted image spam from being displayed on his or her device.

Figure 2A:
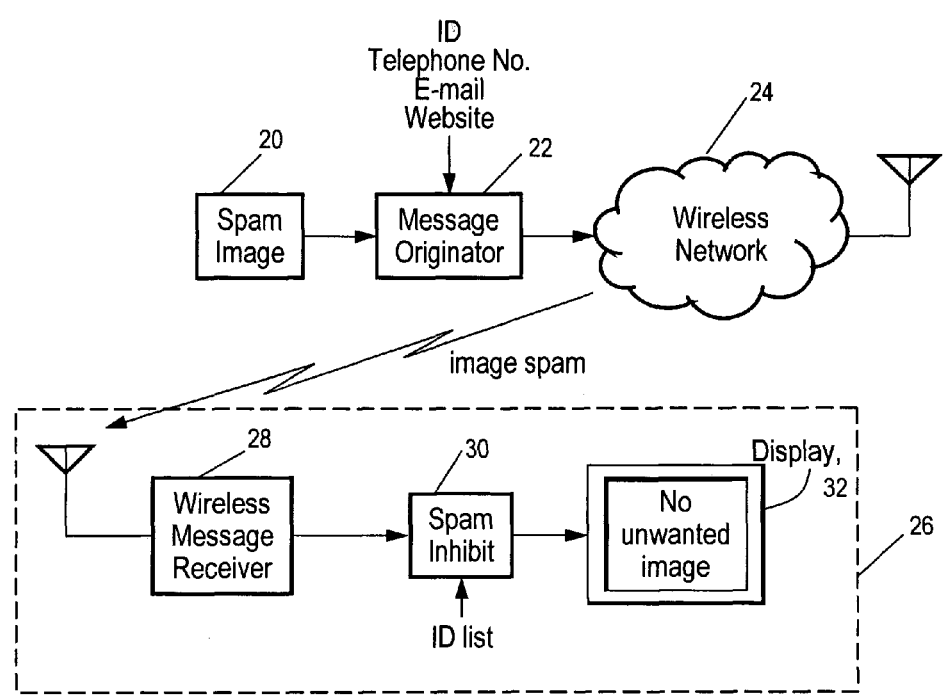
FIG. 2a is a diagrammatic illustration of the subject invention in which a spam inhibit filter is interposed between a wireless transceiver in a message recipient's wireless device and the display on the device for the purpose of inhibiting display of unwanted picture images through the utilization of an ID list created by the message recipient reflecting acceptable message originators, with a comparison between the message originator and the ID list resulting in the inhibiting of unwanted images when no match is found.

Referring now to FIG. 2a, in one embodiment a spam image 20 is generated by a message originator 22 whose identity is known because of his or her telephone number, email address, alphanumeric information or website address. When the spam image is transmitted to wireless network 24, that which is sent to the wireless network is not only the picture or video message, but also information corresponding to the identity of the source of the picture message, namely the message originator.

Under normal circumstances the picture is transmitted via the wireless network to a wireless device 26 that includes a wireless message receiver 28. The output of the message receiver is coupled to a spam filter 30 for inhibiting selected image spam. A preloaded ID list is coupled to filter 30 to identify which message originators are permitted to have their picture messages displayed. When wireless message receiver 28 attempts to output the picture message to a display 32, spam filter 30 inhibits or prohibits the transmission of the image spam to display 32 for those picture messages whose message originators do not match those in the ID list. As an alternative feature of the invention herein, the message recipient can be required to enter a security code or pin that will allow the inhibited picture message to be seen.

In this matter the spam filtering is accomplished at the recipient's device as opposed to being filtered at the network.

Figure 2B:
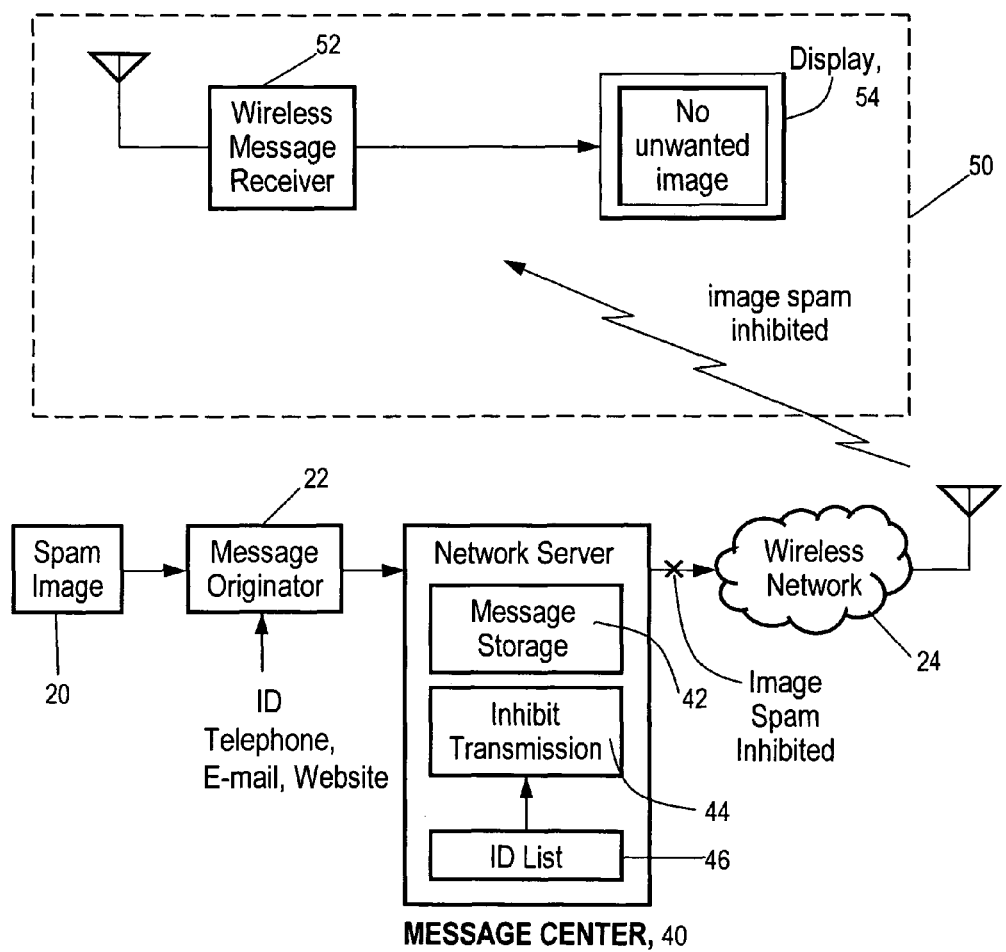
FIG. 2b is a diagrammatic illustration of the case in which a message center is involved showing the transmission of a spam image from a message originator to a message center which includes message storage and a filter for inhibiting the transmission of picture messages having originators which do not match with an ID list.

Referring now to FIG. 2b, the spam may be filtered at a message center 40 of a network or as shown in a message center as depicted elsewhere in the parent application this application claims the benefit of. In this case spam image 20 has an associated message originator 22 as before, with the spam image having an associated image source identifier or message originator ID in terms of a telephone number, email address, alphanumeric tag, or website address. A storage device 42 in the network server stores the picture message and a filter 44 inhibits the transmission or display of picture messages over wireless network 24 when the message originator identifier does not match those in a preloaded ID list 46, provided in one embodiment by the message recipient. Alternatively, a list of undesirable messages originator IDs may be provided. In this case an adaptation is contemplated in which only message originator identifiers that do match those in this undesirable id list result in the inhibiting of the transmission or display of the unwanted picture messages.

The network is therefore responsible for wirelessly transmitting all picture messages to wireless device 50, which in this case has a wireless message receiver 52 coupled directly to a display 54.

In this embodiment the message filtering or spam filtering is accomplished at the message center, such that with the provision by the message recipient of acceptable sources of picture data, it is the network that does the filtering as opposed to the wireless device.

What will be seen is that what is provided is a method of inhibiting the display of unwanted pictures, be they still pictures, icons, graphics or video through the utilization of a filtering function that inhibits the display of images the source of which does not match a preloaded ID list. As mentioned earlier, an alternative embodiment contemplates that the display of unwanted pictures may be inhibited upon a coincidence detection between the received picture message source identification data and a preloaded list of undesirable message originators, either at the message center or from within the wireless portable communication device. This preloaded list may be recipient-generated or may be generated in some other manner such as by networks or other authorities.

Figure 3:
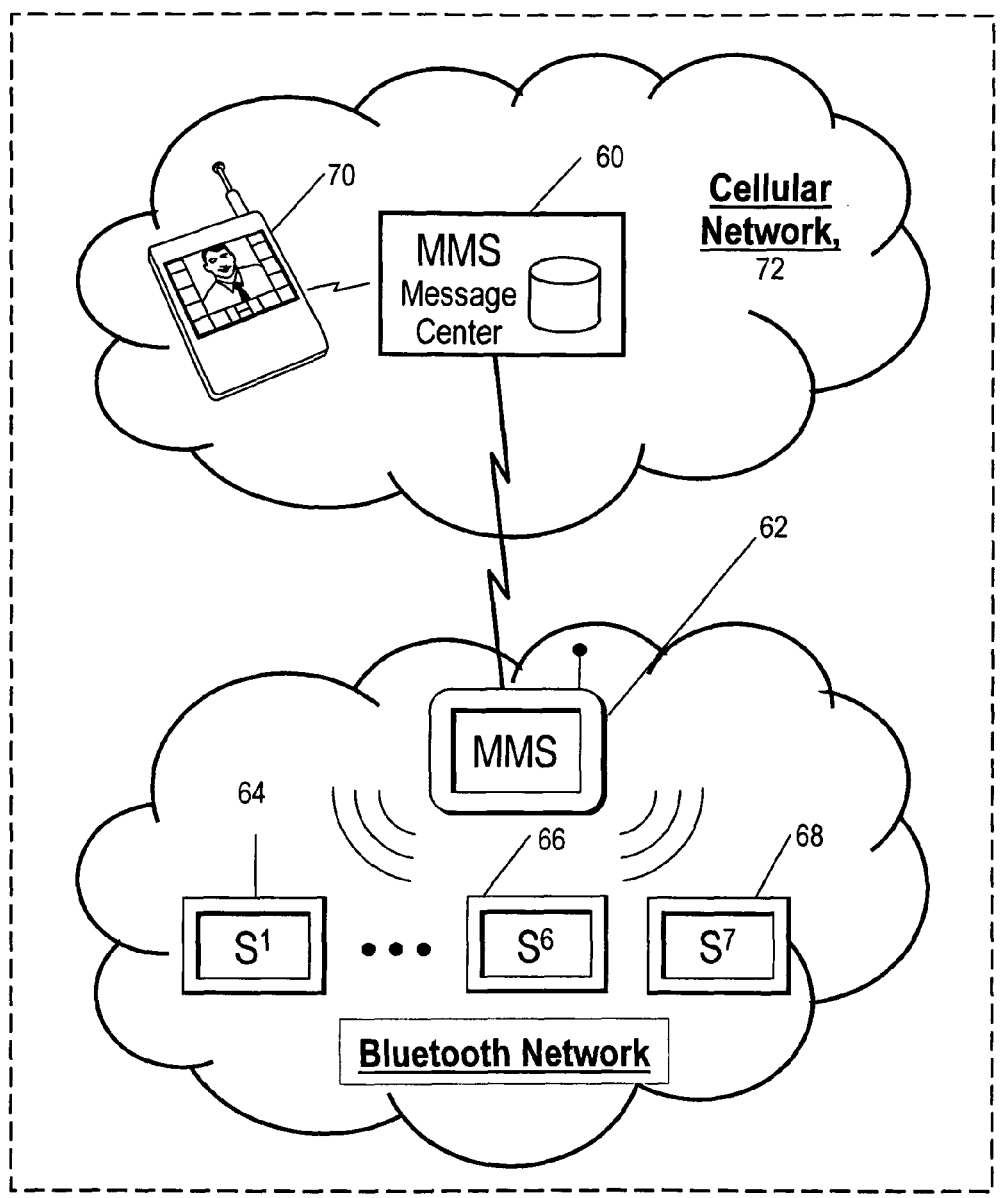
FIG. 3 is a diagrammatic illustration of a digital image network for wireless picture frames involving a message originator who transmits a picture message to a MMS message center within a cellular network, with the picture message being wirelessly transmitted, in one embodiment to a Master unit that in turn wirelessly transmits the picture image to a number of Slave devices, in one embodiment utilizing a Bluetooth network.

The subject system is especially useful in the prevention of unwanted pictures from arriving at digital picture frames. While digital picture frames may be direct coupled to a wireless network, in one embodiment and as shown in FIG. 3, an MMS message center 60 is wirelessly coupled to an MMS Master unit 62, which in turn relays any picture message traffic to a number of Slave units 64, 66 and 68, in one embodiment utilizing Bluetooth techniques. However, this Master/Slave relationship is not limited to Bluetooth transmissions, but may be for instance involve optically coupling or may use the 802.11 protocols.

The picture message inhibit system of FIGS. 2a and 2b may be installed at either at MMS server 60 or at an MMS Master unit 62, as well as for instance at Slave units 64, 66 and 68. With the subject system it is possible to eliminate unwanted pictures from being displayed when the pictures are transmitted over a wireless network to a device which can display the pictures.

Thus, as can be seen in FIG. 3, a picture phone 70 may be utilized to create or generate a picture message which is transmitted to an MMS message center 60 within a cellular network 72, with the message originator information being captured by the MMS message center from the picture phone.

Figure 4:
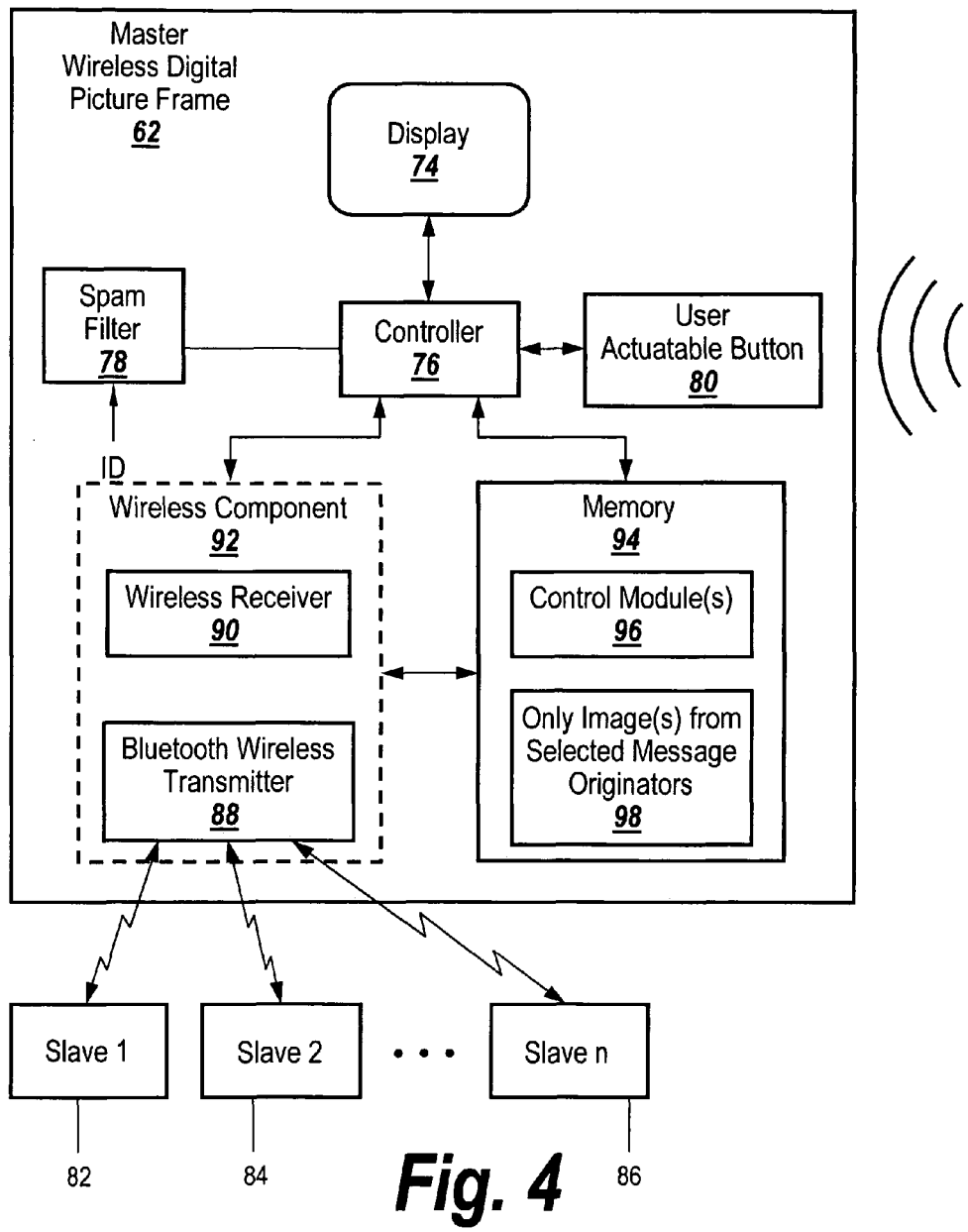
FIG. 4 is a diagrammatic illustration of the Master of FIG. 3 that includes a display and a spam filter coupled to a controller for preventing the transmission of unwanted pictures to a number of Slave devices.

Referring now to FIG. 4, in one embodiment Master 62 may include a display 74 coupled to a controller 76 to which a spam filter 78 is coupled that has been provided with the aforementioned preloaded ID list, against which incoming messages with source identification is compared. Master 62 is provided with a user actuatable button 80 which can be utilized to selectively transmit out the picture messages to one or more Slaves 82, 84 and 86 through the utilization of a Bluetooth wireless transmitter 88 in one embodiment.

As will be seen, both the Master units and the Slaves can be provided with user actuatable buttons, keyboards or the like to for instance specify what pictures are to be transmitted to what Slave and for the Slaves to be able to access selected picture messages from the Master. Thus, the Slaves can manually request updates, whereas the Master can be manually controlled to transmit only selected pictures to selected Slaves. Thus, as part of the subject invention there is manual control of the Master/Slave relationship so that for instance only certain Slaves are provided with recent wireless pictures. The manually controlled system also permits selecting which, if any, Slaves are to receive image transfers at all, whereas the Slaves may be manually controlled to request updates from the Master.

Referring back to FIG. 4, the Master unit which itself can be a wireless picture frame, is provided in one embodiment with a wireless receiver 90, the Bluetooth wireless transmitter 88 and a cellular wireless receiver 90, with these modules being the major components of a wireless component 92. Associated with Master 62 is a memory 94 and a controller module 96. Memory 94 stores the incoming picture messages. However, the only images that are outputted are those sent from selected message originators as illustrated at 98. The acceptable message originators are inputted in terms of the identification or ID of approved message originators entered at spam filter 78. Incoming picture messages and IDs are coupled through controller 76 to memory 94 and then to unit 98 which controls which picture messages can be transmitted to Slave units 82-86. It will be appreciated that in this embodiment the Slave units do not themselves have the ability to compare the picture source identification with a preloaded list. This is because spam filtering is accomplished at the Master unit.

Figure 5:
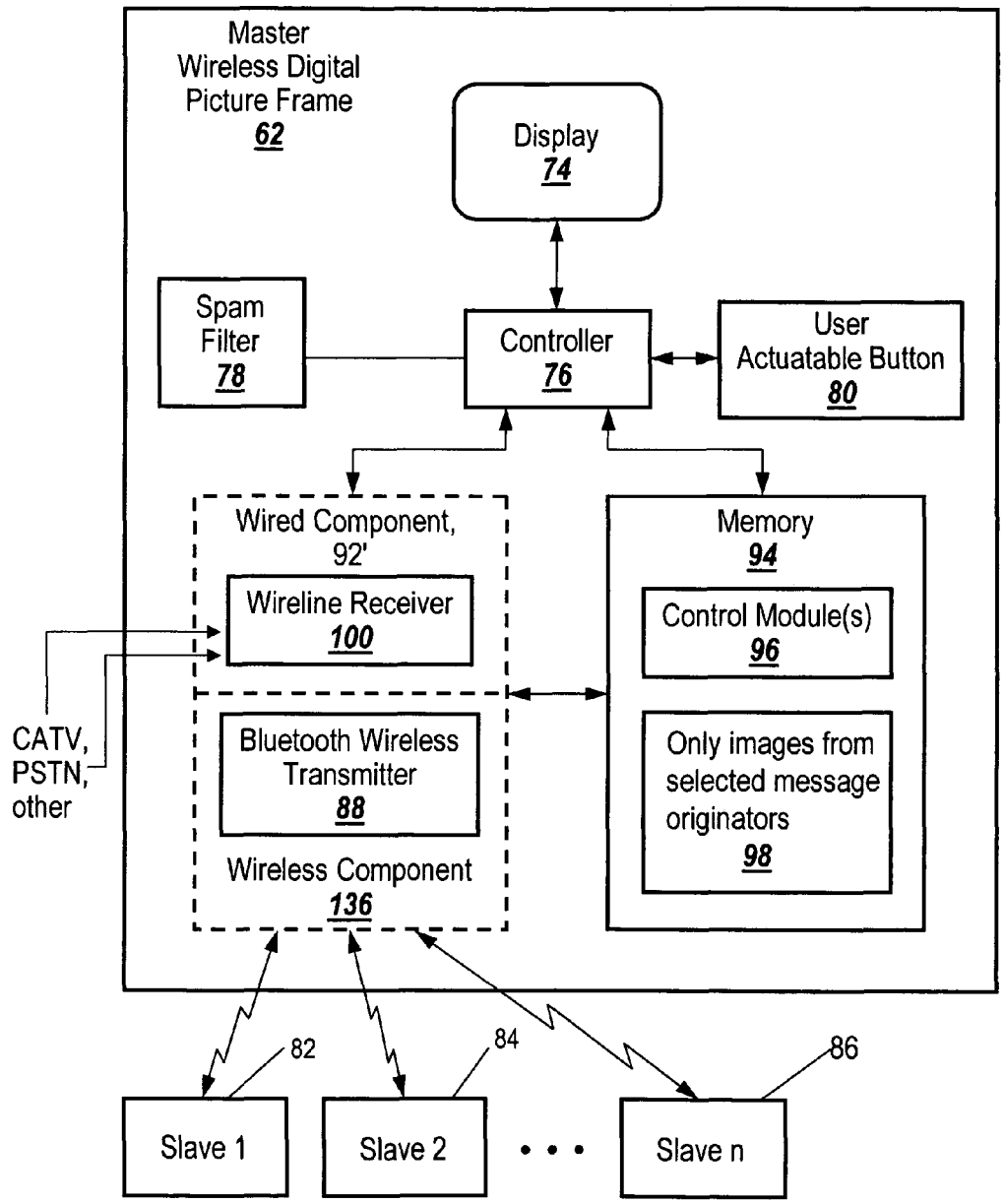
FIG. 5 is a diagrammatic illustration of the Master of FIG. 4, wherein the Master has a wire line receiver capable of receiving CATV, PSTN and other wire-line transmitted images, with the spam filter being able to inhibit wireless transmission of unwanted pictures to a number of Slaves.

Referring to FIG. 5 in which like reference characters are utilized to identify like elements; what can be seen is that rather than having a wireless receiver 90, what is provided in this embodiment is a wire line receiver 100 capable of receiving CATV, PSTN, and other wire line transmissions.

Thus, it can be seen that picture data can either be wirelessly transmitted to the Master unit or can be transmitted through a wire-line connection to the Master unit. Here the wired component is designated by reference character 92'.

The wireless component in this case is the wireless transmission from the Master unit to the Slaves.

Figure 6:
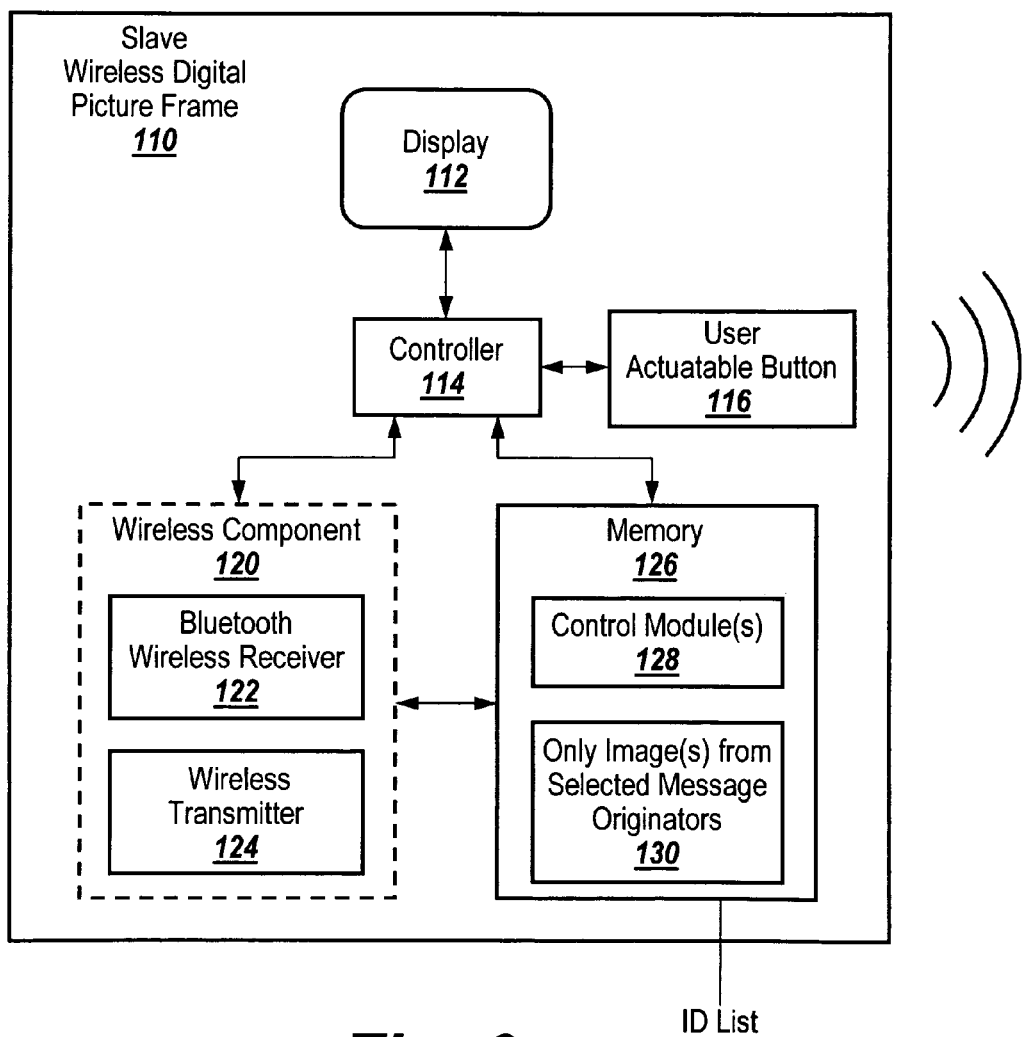
FIG. 6 is a diagrammatic illustration of the Slave of either FIG. 4 or FIG. 5 usable as a digital picture frame, illustrating the ability to wirelessly receive picture message data from the Master.

Referring to FIG. 6, what is shown is a Slave 110 which has its own display 112 and a controller 114 as well as a user actuatable switch 116 to poll the associated Master unit. The Slave has a wireless component 120 which in one embodiment includes a Bluetooth wireless receiver 122 for receiving the picture messages from the associated Master, and also includes a wireless transmitter 124 which may be utilized to communicate with the Master unit, for instance select what pictures are to be wirelessly transmitted to the Slave.

The Slave also has a memory 126, a control module 128 and a spam filter 130 which only allows images to be displayed from selected message originators. In this case while messages may have been previously filtered at the Master, Slave 110 can perform the filtering function itself.

Figure 7:
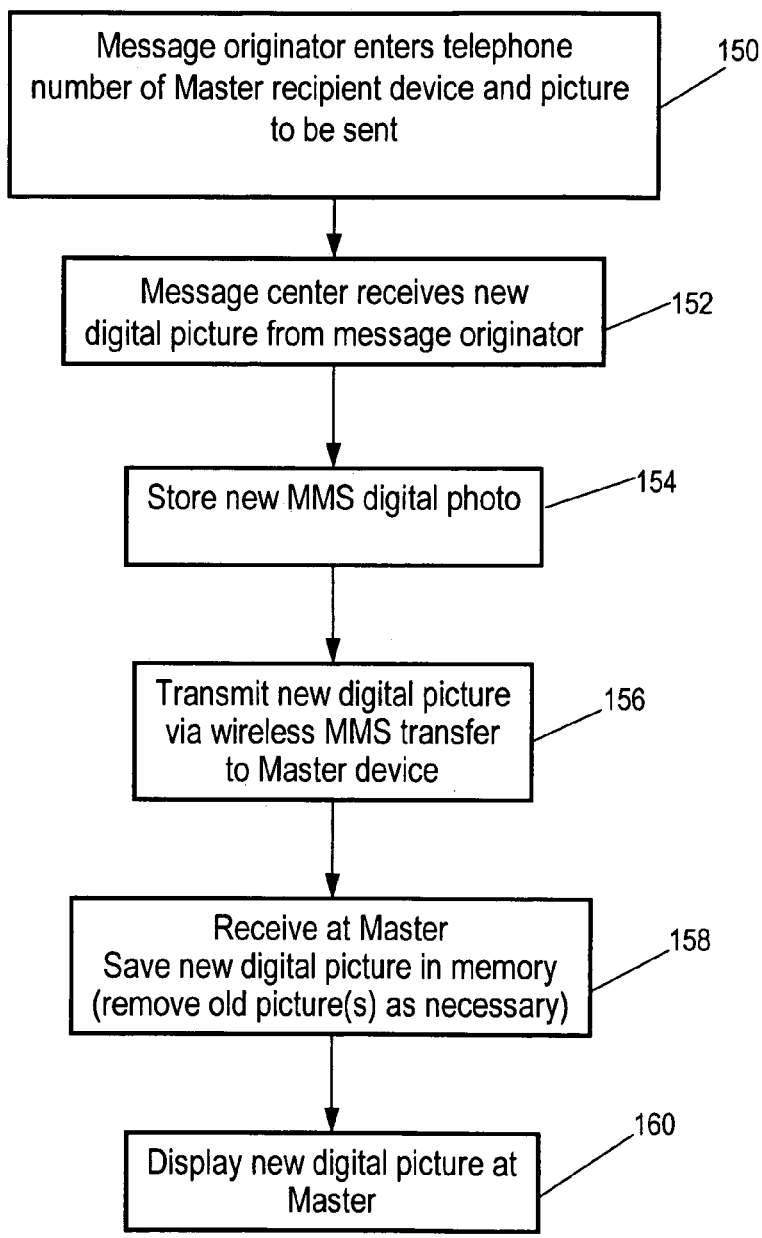
FIG. 7 is a flow chart showing the transmission of a picture message from a message originator who enters the telephone number of a Master recipient device to which the picture is to be sent, with a message center receiving and storing the picture message and wirelessly transmitting the picture message to the Master where the picture message is received and displayed; and, FIG. 8 is a flow chart illustrating the receipt of an image transfer request from a Slave, for the accessing of the requested image in a Master memory and a wireless transmission of the requested image from the Master memory to a Slave or other external device.

Referring now to FIG. 7, a flow chart for the subject system requires a message originator to enter the telephone number of a Master unit that is to receive picture message data, with the picture to be sent illustrated at 150. Thereafter, this information is transmitted to a message center 152 which receives the new digital picture data from the message originator and stores it as a new MMS digital photo as illustrated at 154. Thereafter, the new digital picture is transmitted via wireless MMS transfer as shown at 156, whereupon it is received at a Master unit 158 that saves the new digital picture in memory and removes old pictures as necessary. Finally, the new digital picture is displayed at the Master unit as illustrated at 160. All of this may occur with or without the image spam filtering described above. However, the flow chart shown in FIG. 7 illustrates that at least as far as wireless picture frames are concerned how one can transmit wireless picture imagery to a Master unit at which the picture message may be displayed if desired.

Figure 8:
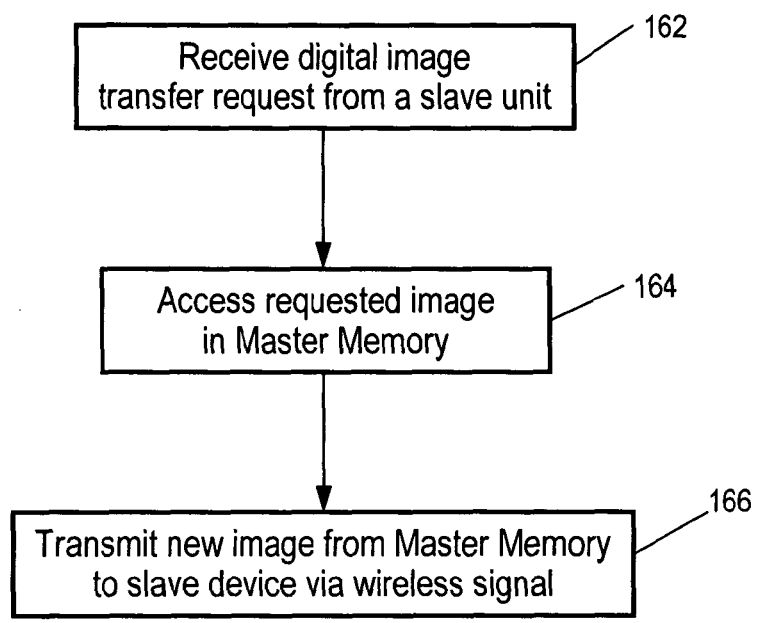

Referring to FIG. 8 at a Slave device, the Slave as illustrated at 162 requests the transmission of a digital image from the associated Master such that it receives a transfer of the digital image upon request.

As illustrated at 164, the requested images are accessed at the Master memory and are then transmitted from the Master memory to the Slave device as illustrated at 166.

What is set forth above is a description of what is currently believed to be the preferred embodiment or best example of the invention claimed. Future and present alternatives and modifications which make insubstantial changes in function, in purpose, in structure or in result are intended to be covered by the claims of this patent. Where alternative meanings are possible, the broadest meaning is intended. All words used in the claims are intended to be used in the normal, customary usage of grammar and the English language and are accorded their ordinary meanings.

While the inventions have been shown in only one of its forms, it is not thus limited but is susceptible to various changes and modifications without departing from the spirit thereof. The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. While the inventions have been particularly shown and described with reference to certain preferred embodiments, it will be understood by those skilled in the art that various modifications in form and detail may be made therein without departing from the scope and spirit of the inventions. Accordingly, modification to the preferred embodiments will be readily apparent to those skilled in the art, and the generic principles defined herein may be applied to other embodiments or applications without departing from the scope and spirit of the inventions.

What is claimed is:

1. A wireless portable communication device, comprising:
 a receiver cellular telephone adapted to receive a picture message from a message center over a wireless connection, the message including a non-facsimile picture supplied by the message originator and a caller ID automatically provided by a communications network that identifies the telephone number of the message originator, said cellular phone having a display and a controller that enables the display of the picture and caller ID on the display.

2. The wireless portable communication device of claim 1, wherein the wireless portable communication device includes a memory to store the received picture.

3. The wireless portable communication device of claim 2, wherein the received picture and the associated caller ID is stored in the memory.

4. The wireless portable communication device of claim 3, wherein the caller ID is displayed on the display to assist a user of the wireless portable communication device in identifying a source of the received message.

5. The wireless portable communication device of claim 4, further including an input adapted to enable a user of the wireless portable communication device to select the caller ID associated with the received message in order to display the picture associated with the message.

6. The wireless portable communication device of claim 1, wherein at least a portion of the received message is compressed, and wherein the compressed portion of the message is decompressed.

7. The wireless portable communication device of claim 1, wherein at least a portion of the received message is encrypted, and wherein the encrypted portion of the message is decrypted.

8. The wireless portable communication device of claim 1, wherein the receiver comprises at least one of a cellular telephone receiver and a radio frequency receiver.

9. The wireless portable communication device of claim 5, wherein the received picture and associated caller ID is stored in a contiguous area of memory.

10. The wireless portable communication device of claim 5, wherein the received picture and associated caller ID is stored in non-contiguous areas of memory.

11. The wireless portable communication device of claim 5, wherein a plurality of messages are stored in the memory along with associated indications of the time the messages are received, and wherein the controller is coupled to display the messages to a user of the wireless communication device based on the time the messages were received.

12. A wireless portable communication device, comprising:
a cellular telephone having a CPU and adapted to receive a message from a message center over a wireless connection, the message including a non-facsimile picture supplied by a message originator and a Caller ID automatically provided by a communications network that identifies the telephone number of the message originator, the receiver coupled to the CPU;
a memory that stores (1) Caller ID data received and (2) data associated with actual or potential communicants in a database, wherein the data represents at least one of: a) telephone number; b) name; c) address; and, d) picture information;
a display coupled to and operable by the CPU that allows viewing data stored in memory that is associated with actual or potential communicants or received Caller ID data;
a connector; and;
a detachable input interface that is releasably connected to the connector that is utilized to add or modify the stored data associated with actual or potential communicants.

13. The wireless portable communication device of claim 12, wherein the display displays a cursor therewithin at a cursor location and further including a plurality of data fields maintained within the database that allows for entry or modification of data in the data fields at a cursor location that is presented within the display.

14. The wireless portable communication device of claim 12, wherein the display includes a touch display.

15. The wireless portable communication device of claim 14, wherein the touch display includes a graphical user interface.

16. The wireless portable communication device of claim 12, wherein the display includes a graphical user interface.

17. The wireless, portable communications device of claim 12, wherein the communications network includes a cellular system.

18. The wireless portable communication device of claim 12, wherein the portable communication device displays at least some of the stored data associated with an actual or potential communicant and Caller ID data at the same time.

19. The wireless portable communication device of claim 18, wherein the portable communication device displays at least some of the stored data associated with an actual or potential communicant and Caller ID data at the same time and in response to receiving the Caller ID data from the wireless communication system.

20. The wireless portable communication device of claim 12, wherein the connector is one of: a) a serial interface connector; b) a parallel interface connector; and c) an infrared interface connector.

21. The wireless portable communication device of claim 12, wherein at least one of (a) the stored data associated with an actual or potential communicant or (b) Caller ID data received is used to generate a signal for the called party to return a call to an actual communicant.

22. The wireless portable communication device of claim 12, wherein for the cellular telephone at least one of (a) the stored data associated with an actual or potential communicant or (b) Caller ID data received is used to generate a signal for the called party to return a call to an actual communicant.

23. The wireless portable communication device of claim 12, wherein the stored data associated with a potential communicant is used to generate a signal to place a call.

24. The wireless portable communication device of claim 12, wherein for the cellular telephone device the stored data associated with a potential communicant is used to generate a signal to place a call.

25. The wireless portable communication device of claim 12, wherein for the wireless portable communication device the detachable input interface is at least one of (a) a detachable keyboard and (b) a connection to a personal computer.

26. The wireless portable communication device of claim 12, wherein for the cellular telephone the detachable input interface is at least one of (a) a detachable keyboard and (b) a connection to a personal computer.

27. The wireless portable communication device of claim 12, wherein the cellular telephone receives a wireless signal containing data associated with actual or potential communicants, and wherein the data represents at least one of: a) telephone number; b) name; c) address; d) e-mail address; and, e) image.

28. The wireless portable communication device of claim 12, wherein for the cellular telephone the cellular telephone receives a wireless signal containing data associated with actual or potential communicants, and wherein the data represents at least one of: a) telephone number; b) name; c) address; d) e-mail address; and, e) image.

29. The wireless portable communication device of claim 12, wherein the memory includes a portable data card.

30. The wireless portable communication device of claim 12, wherein the memory includes a portable data card.

31. The wireless portable communication device of claim 12, wherein data associated with an actual or potential communicant is entered or updated in response to a prompt that a person is not listed in the database stored in the personal communication device.

32. The wireless portable communication device of claim 12, wherein data associated with an actual or potential communicant is entered or updated in response to a prompt that a person is not listed in the database stored in the personal communication device.

33. A wireless portable communication device, comprising:
- a receiver adapted to receive a video message including video from a message center over a wireless connection, the message including video supplied by the message originator and a caller ID automatically provided by a communications network that identifies the telephone number of the message originator;
- a display; and,
- a controller that enables the display of the video and caller ID on the display.

34. The wireless portable communication device of claim 33, wherein the wireless portable communication device includes a memory to store the received video.

35. The wireless portable communication device of claim 33, wherein the received video and the Caller ID are stored in the memory.

36. The wireless portable communication device of claim 34, wherein the Caller ID is displayed on the display to assist a user of the wireless portable communication device in identifying a source of the received message.

37. The wireless portable communication device of claim 33, and further including an input that enables a user of the wireless portable communication device to select the Caller ID associated with the received video message in order to display the video associated with the message.

38. The wireless portable communication device of claim 33, wherein at least a portion of the video message is compressed, and wherein the compressed portion of the video message is decompressed.

39. The wireless portable communication device of claim 33, wherein at least a portion of the video message is encrypted, and wherein the encrypted portion of the video message is decrypted.

* * * * *

UNITED STATES PATENT AND TRADEMARK OFFICE
CERTIFICATE OF CORRECTION

| | | |
|---|---|---|
| PATENT NO. | : 8,160,221 B2 | Page 1 of 1 |
| APPLICATION NO. | : 12/380320 | |
| DATED | : April 17, 2012 | |
| INVENTOR(S) | : Daniel A. Henderson | |

It is certified that error appears in the above-identified patent and that said Letters Patent is hereby corrected as shown below:

Col. 11, line 18 should read,

35. The wireless portable communication device of claim 34, wherein the received video and the Caller ID are stored in the memory.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,160,221 B2  
APPLICATION NO. : 12/380320  
DATED : April 17, 2012  
INVENTOR(S) : Daniel A. Henderson Page 1 of 39

It is certified that error appears in the above-identified patent and that said Letters Patent is hereby corrected as shown below:

Under item (56), References Cited:
Add the following references as shown on the attached pages.

Signed and Sealed this
Fourteenth Day of August, 2012

David J. Kappos
*Director of the United States Patent and Trademark Office*

CERTIFICATE OF CORRECTION (continued)
U.S. Pat. No. 8,160,221 B2

References Cited [Referenced By]

U.S. Patent Documents

| | | |
|---|---|---|
| 3727003 | April 1973 | Paraskevakos |
| 3787626 | January 1974 | Subieta |
| 3812296 | May 1974 | Paraskevakos |
| 3984625 | October 1976 | Camras |
| 4065642 | December 1977 | McClure |
| 4072824 | February 1978 | Phillips |
| 4075038 | February 1978 | Anthony et al. |
| 4087638 | May 1978 | Hayes et al. |
| 4103107 | July 1978 | D'Amico et al. |
| 4117542 | September 1978 | Klausner et al. |
| 4126768 | November 1978 | Grenzow |
| 4172969 | October 1979 | Levine et al. |
| 4178475 | December 1979 | Taylor et al. |
| 4178476 | December 1979 | Frost |
| 4197526 | April 1980 | Levine et al. |
| 4258387 | March 1981 | Lemelson |
| 4263480 | April 1981 | Levine |
| 4266098 | May 1981 | Novak |
| 4304968 | December 1981 | Klausner et al. |
| 4306116 | December 1981 | McClure et al. |
| 4313035 | January 1982 | Jordan et al. |
| 4330780 | May 1982 | Masaki |
| 4336524 | June 1982 | Levine |
| 4341926 | July 1982 | Chester |
| 4356519 | October 1982 | Cogdell, Jr. |
| 4368989 | January 1983 | Kawashima |
| 4378551 | March 1983 | Drapac |
| 4382256 | May 1983 | Nagata |
| 4388000 | June 1983 | Hagihara |
| 4402056 | August 1983 | Sado et al. |
| 4408099 | October 1983 | Ishii |
| 4424514 | January 1984 | Fennell et al. |
| 4427848 | January 1984 | Tsakanikas |
| 4427980 | January 1984 | Fennell et al. |
| 4438433 | March 1984 | Smoot et al. |

CERTIFICATE OF CORRECTION (continued)
U.S. Pat. No. 8,160,221 B2

| | | |
|---|---|---|
| 4451707 | May 1984 | Hanscom |
| 4477807 | October 1984 | Nakajima et al. |
| 4479124 | October 1984 | Rodriguez et al. |
| 4481670 | November 1984 | Freeburg |
| 4490579 | December 1984 | Godoshian |
| RE31789 | January 1985 | Hashimoto |
| 4536739 | August 1985 | Nobuta |
| 4551581 | November 1985 | Doughty |
| 4578537 | March 1986 | Faggin et al. |
| 4582956 | April 1986 | Doughty |
| 4600809 | July 1986 | Tatsumi et al. |
| 4608460 | August 1986 | Carter et al. |
| 4618860 | October 1986 | Mori |
| 4625081 | November 1986 | Lotito et al. |
| 4639225 | January 1987 | Washizuka |
| 4644351 | February 1987 | Zabarky et al. |
| 4654718 | March 1987 | Sueyoshi |
| 4660218 | April 1987 | Hashimoto |
| 4661972 | April 1987 | Kai |
| 4680785 | July 1987 | Akiyama et al. |
| 4682148 | July 1987 | Ichikawa et al. |
| 4692742 | September 1987 | Raizen et al. |
| 4704608 | November 1987 | Sato et al. |
| 4706272 | November 1987 | Nishimura et al. |
| 4713808 | December 1987 | Gaskill et al. |
| 4716583 | December 1987 | Groner et al. |
| 4720848 | January 1988 | Akiyama |
| 4737979 | April 1988 | Hashimoto |
| 4742516 | May 1988 | Yamaguchi |
| 4747122 | May 1988 | Bhagat et al. |
| 4754473 | June 1988 | Edwards |
| 4766294 | August 1988 | Nara et al. |
| 4766434 | August 1988 | Matai et al. |
| 4769764 | September 1988 | Levanon |
| 4775999 | October 1988 | Williams |
| 4776005 | October 1988 | Petriccione et al. |
| 4779138 | October 1988 | Nomura et al. |
| 4796291 | January 1989 | Makino |

| | | |
|---|---|---|
| 4800582 | January 1989 | D'Agosto, III et al. |
| 4802200 | January 1989 | Murata et al. |
| 4802209 | January 1989 | Hasegawa |
| 4803726 | February 1989 | Levine et al. |
| 4806906 | February 1989 | Oda et al. |
| 4811379 | March 1989 | Grandfield |
| 4811382 | March 1989 | Sleevi |
| 4812743 | March 1989 | Champion, III et al. |
| 4814763 | March 1989 | Nelson et al. |
| 4821308 | April 1989 | Hashimoto |
| 4827520 | May 1989 | Zeinstra |
| 4845491 | July 1989 | Fascenda et al. |
| 4850012 | July 1989 | Mehta et al. |
| 4853688 | August 1989 | Andros et al. |
| 4853952 | August 1989 | Jachmann et al. |
| 4868560 | September 1989 | Oliwa et al. |
| 4868561 | September 1989 | Davis |
| 4868860 | September 1989 | Anddros et al. |
| 4872005 | October 1989 | DeLuca et al. |
| 4873520 | October 1989 | Fisch et al. |
| 4873719 | October 1989 | Reese |
| 4878051 | October 1989 | Andros et al. |
| 4882579 | November 1989 | Siwiak |
| 4882744 | November 1989 | Hashimoto |
| 4882750 | November 1989 | Henderson et al. |
| 4884132 | November 1989 | Morris et al. |
| 4885577 | December 1989 | Nelson |
| 4893335 | January 1990 | Fuller et al. |
| 4894861 | January 1990 | Fujioka |
| 4897835 | January 1990 | Gaskill et al. |
| 4899358 | February 1990 | Blakley |
| 4914624 | April 1990 | Dunthorn |
| 4914649 | April 1990 | Schwendeman et al. |
| 4914691 | April 1990 | Berger |
| 4918721 | April 1990 | Hashimoto |
| 4922221 | May 1990 | Sato et al. |
| 4922490 | May 1990 | Blakley |
| 4924496 | May 1990 | Figa et al. |

| | | |
|---|---|---|
| 4928096 | May 1990 | Leonardo et al. |
| 4928302 | May 1990 | Kaneuchi et al. |
| 4940963 | July 1990 | Gutman et al. |
| 4941167 | July 1990 | Cannalte et al. |
| 4942598 | July 1990 | Davis |
| 4951043 | August 1990 | Minami |
| RE33417 | October 1990 | Bhagat et al. |
| 4961216 | October 1990 | Baehr et al. |
| 4962377 | October 1990 | Wallace et al. |
| 4962545 | October 1990 | Klaczak et al. |
| 4965569 | October 1990 | Bennett et al. |
| 4975683 | December 1990 | Davis et al. |
| 4975693 | December 1990 | Davis et al. |
| 4985913 | January 1991 | Shalom et al. |
| 4985918 | January 1991 | Tanaka et al. |
| 4994797 | February 1991 | Breeden |
| 4996707 | February 1991 | O'Malley et al. |
| 5007076 | April 1991 | Blakley |
| 5014296 | May 1991 | Saigano |
| 5023905 | June 1991 | Wells et al. |
| D319053 | August 1991 | Atkins |
| 5043721 | August 1991 | May |
| 5046079 | September 1991 | Hashimoto |
| 5047764 | September 1991 | Andros et al. |
| 5049874 | September 1991 | Ishida et al. |
| 5052943 | October 1991 | Davis et al. |
| 5057676 | October 1991 | Komaki |
| 5063588 | November 1991 | Patsiokas et al. |
| 5066949 | November 1991 | Breeden et al. |
| 5070521 | December 1991 | Warner et al. |
| 5073767 | December 1991 | Holmes et al. |
| 5075684 | December 1991 | DeLuca |
| 5077786 | December 1991 | Hashimoto |
| 5090051 | February 1992 | Muppidi et al. |
| 5093659 | March 1992 | Yamada |
| 5095307 | March 1992 | Shimura et al. |
| 5099507 | March 1992 | Mukai et al. |
| 5109220 | April 1992 | Breeden et al. |

| | | |
|---|---|---|
| 5115233 | May 1992 | Zdunek et al. |
| 5117449 | May 1992 | Metroka et al. |
| 5119397 | June 1992 | Dahlin et al. |
| 5121423 | June 1992 | Morihiro et al. |
| 5124697 | June 1992 | Moore |
| 5127040 | June 1992 | D'Avello et al. |
| 5128980 | July 1992 | Choi |
| 5128981 | July 1992 | Tsukamoto et al. |
| 5134645 | July 1992 | Berken et al. |
| 5142279 | August 1992 | Jasinski et al. |
| 5144654 | September 1992 | Kelley et al. |
| 5146217 | September 1992 | Holmes |
| 5146493 | September 1992 | Kiguchi et al. |
| 5148469 | September 1992 | Price |
| 5148473 | September 1992 | Freeland et al. |
| 5151929 | September 1992 | Wolf |
| 5151930 | September 1992 | Hagl |
| 5153579 | October 1992 | Fisch et al. |
| 5153582 | October 1992 | Davis |
| 5159624 | October 1992 | Makita |
| 5161181 | November 1992 | Zwick |
| 5166973 | November 1992 | Hoff |
| 5175875 | December 1992 | Yokaya et al. |
| 5182553 | January 1993 | Kung |
| 5187645 | February 1993 | Spalding et al. |
| 5189632 | February 1993 | Paajanen et al. |
| 5195130 | March 1993 | Weiss et al. |
| 5195183 | March 1993 | Miller et al. |
| 5197092 | March 1993 | Bamburak |
| 5206637 | April 1993 | Warren |
| 5206900 | April 1993 | Callele |
| 5208849 | May 1993 | Fu |
| 5208850 | May 1993 | Kino |
| 5212721 | May 1993 | Deluca et al. |
| 5220599 | June 1993 | Sasano et al. |
| 5222125 | June 1993 | Creswell et al. |
| 5224150 | June 1993 | Neustein |
| 5225826 | July 1993 | Deluca et al. |

CERTIFICATE OF CORRECTION (continued)
U.S. Pat. No. 8,160,221 B2

| | | |
|---|---|---|
| 5227614 | July 1993 | Danielson et al. |
| 5228073 | July 1993 | Smith |
| 5228080 | July 1993 | Nutter et al. |
| 5239577 | August 1993 | Bates et al. |
| 5241303 | August 1993 | Register et al. |
| 5241305 | August 1993 | Fascenda et al. |
| 5247700 | September 1993 | Wohl et al. |
| 5251250 | October 1993 | Obata et al. |
| 5252964 | October 1993 | Tan et al. |
| 5257307 | October 1993 | Ise |
| 5258751 | November 1993 | Deluca et al. |
| 5260986 | November 1993 | Pershan |
| 5263084 | November 1993 | Chaput et al. |
| 5264992 | November 1993 | Hogdahl |
| 5265145 | November 1993 | Lim |
| 5272465 | December 1993 | Meares, Jr. |
| 5274454 | December 1993 | Higgins, Jr. |
| 5274699 | December 1993 | Ranz |
| 5276729 | January 1994 | Higuchi et al. |
| 5276731 | January 1994 | Arbel et al. |
| 5278889 | January 1994 | Papanicolaou |
| 5278894 | January 1994 | Shaw |
| 5280516 | January 1994 | Jang |
| 5280521 | January 1994 | Itoh |
| 5281962 | January 1994 | Vanden Heuvel et al. |
| 5282243 | January 1994 | Dabbashi et al. |
| 5283818 | February 1994 | Klausner et al. |
| 5283824 | February 1994 | Shaw |
| 5285493 | February 1994 | Wagai et al. |
| 5285496 | February 1994 | Frank et al. |
| 5289528 | February 1994 | Ueno et al. |
| 5289530 | February 1994 | Reese |
| 5297192 | March 1994 | Gerszberg |
| 5302947 | April 1994 | Fuller et al. |
| 5303291 | April 1994 | Takagi et al. |
| 5307399 | April 1994 | Dai et al. |
| 5309512 | May 1994 | Blackmon et al. |
| 5311570 | May 1994 | Grimes et al. |

| | | |
|---|---|---|
| 5313515 | May 1994 | Allen et al. |
| 5315636 | May 1994 | Patel |
| 5315642 | May 1994 | Fernandez |
| 5317621 | May 1994 | Shibayama |
| 5321742 | June 1994 | Stevens |
| 5323148 | June 1994 | Olazabal et al. |
| 5325419 | June 1994 | Connolly |
| D348654 | July 1994 | Branck et al. |
| 5327480 | July 1994 | Breeden |
| 5327486 | July 1994 | Wolff et al. |
| 5329427 | July 1994 | Hogdahl |
| 5329578 | July 1994 | Brennan et al. |
| 5329581 | July 1994 | Friedes et al. |
| 5331580 | July 1994 | Miller et al. |
| 5333179 | July 1994 | Yamamoto et al. |
| 5335276 | August 1994 | Thompson et al. |
| 5337044 | August 1994 | Folger et al. |
| 5341411 | August 1994 | Hashimoto |
| 5341414 | August 1994 | Popke |
| 5343319 | August 1994 | Moore |
| 5343516 | August 1994 | Callele et al. |
| D350345 | September 1994 | Lindeman et al. |
| 5345258 | September 1994 | Matsubara |
| 5348347 | September 1994 | Shink |
| 5349636 | September 1994 | Irribarren |
| 5349638 | September 1994 | Pitroda et al. |
| 5363429 | November 1994 | Fujisawa |
| 5371781 | December 1994 | Ardon |
| 5375161 | December 1994 | Fuller et al. |
| 5377326 | December 1994 | Mura et al. |
| 5381138 | January 1995 | Stair et al. |
| 5384831 | January 1995 | Creswell et al. |
| 5384910 | January 1995 | Torres |
| 5387904 | February 1995 | Takada |
| 5388150 | February 1995 | Schneyer et al. |
| 5390236 | February 1995 | Klausner et al. |
| 5390346 | February 1995 | Marz |
| 5390362 | February 1995 | Modjeska et al. |

| | | |
|---|---|---|
| 5392342 | February 1995 | Rosenthal |
| 5392452 | February 1995 | Davis |
| 5394140 | February 1995 | Wong et al. |
| 5398279 | March 1995 | Frain |
| 5402466 | March 1995 | Delahanty |
| 5404400 | April 1995 | Hamilton |
| 5408382 | April 1995 | Schultz et al. |
| 5410541 | April 1995 | Hotto |
| 5412719 | May 1995 | Hamamoto et al. |
| 5414418 | May 1995 | Andros et al. |
| 5414444 | May 1995 | Britz |
| 5418529 | May 1995 | De Luigi et al. |
| 5418835 | May 1995 | Frohman et al. |
| 5422656 | June 1995 | Allard et al. |
| 5422942 | June 1995 | Kakwashima |
| 5426426 | June 1995 | Hymel |
| 5426594 | June 1995 | Wright et al. |
| 5428663 | June 1995 | Grimes et al. |
| 5428823 | June 1995 | Ness-Cohn et al. |
| 5430436 | July 1995 | Fennell |
| 5430439 | July 1995 | Bodet et al. |
| 5432841 | July 1995 | Rimer |
| 5434929 | July 1995 | Beernink et al. |
| 5440559 | August 1995 | Gaskill |
| 5444768 | August 1995 | Lemaire et al. |
| 5444869 | August 1995 | Stricklin et al. |
| 5446678 | August 1995 | Saltzstein et al. |
| 5448627 | September 1995 | Ueno et al. |
| 5448632 | September 1995 | Iyob et al. |
| 5452356 | September 1995 | Albert |
| 5454029 | September 1995 | Noda |
| 5455579 | October 1995 | Bennett et al. |
| 5457732 | October 1995 | Goldberg |
| 5459458 | October 1995 | Richardson et al. |
| 5459773 | October 1995 | Hwang |
| 5465288 | November 1995 | Falvey et al. |
| 5465401 | November 1995 | Thompson |
| 5467385 | November 1995 | Reuben et al. |

| | | |
|---|---|---|
| 5468947 | November 1995 | Danielson et al. |
| 5469491 | November 1995 | Morley, Jr. et al. |
| 5473316 | December 1995 | Takaya |
| 5473667 | December 1995 | Neustein |
| 5473671 | December 1995 | Partridge, III |
| 5475738 | December 1995 | Penzius |
| 5479475 | December 1995 | Grob et al. |
| 5481595 | January 1996 | Ohashi et al. |
| 5483580 | January 1996 | Brandman et al. |
| 5483595 | January 1996 | Owen |
| 5485504 | January 1996 | Ohnsorge |
| 5485505 | January 1996 | Norman et al. |
| 5487108 | January 1996 | Atkins et al. |
| 5491507 | February 1996 | Umezawa |
| 5491739 | February 1996 | Wadin et al. |
| 5495284 | February 1996 | Katz |
| 5495344 | February 1996 | Callaway et al. |
| 5497464 | March 1996 | Yeh |
| 5502761 | March 1996 | Duncan et al. |
| 5506891 | April 1996 | Brown |
| 5509053 | April 1996 | Gowda et al. |
| 5510778 | April 1996 | Krieter et al. |
| 5511109 | April 1996 | Hartley et al. |
| 5515303 | May 1996 | Cargin et al. |
| 5517557 | May 1996 | Tanaka |
| 5524137 | June 1996 | Rhee |
| 5524140 | June 1996 | Klausner et al. |
| 5526411 | June 1996 | Krieter |
| 5530740 | June 1996 | Irribarren et al. |
| 5533095 | July 1996 | Kikuchi |
| 5535257 | July 1996 | Goldberg et al. |
| 5541976 | July 1996 | Ghisler |
| 5544010 | August 1996 | Schultz et al. |
| 5544358 | August 1996 | Capps et al. |
| 5546447 | August 1996 | Skarbo et al. |
| 5548477 | August 1996 | Kumar et al. |
| 5548636 | August 1996 | Bannister et al. |
| 5548814 | August 1996 | Lorang et al. |

| | | |
|---|---|---|
| 5553125 | September 1996 | Martensson |
| 5557320 | September 1996 | Krebs |
| 5557605 | September 1996 | Grube et al. |
| 5559859 | September 1996 | Dai et al. |
| 5559860 | September 1996 | Mizikovsky |
| 5559862 | September 1996 | Bhagat et al. |
| 5559868 | September 1996 | Blonder |
| 5561702 | October 1996 | Lipp et al. |
| 5561703 | October 1996 | Arledge et al. |
| 5566226 | October 1996 | Mizoguchi et al. |
| 5572576 | November 1996 | Klausner et al. |
| 5574481 | November 1996 | Lee |
| 5574725 | November 1996 | Sharma et al. |
| 5577103 | November 1996 | Foti |
| 5579239 | November 1996 | Freeman |
| 5579375 | November 1996 | Ginter |
| 5579377 | November 1996 | Rogers |
| 5581594 | December 1996 | McAfee |
| 5581595 | December 1996 | Iwashita |
| 5581803 | December 1996 | Grube et al. |
| 5583564 | December 1996 | Rao et al. |
| 5583920 | December 1996 | Wheeler, Jr. |
| 5584054 | December 1996 | Tyneski et al. |
| 5584070 | December 1996 | Harris et al. |
| 5588037 | December 1996 | Fuller et al. |
| 5588038 | December 1996 | Snyder |
| 5590373 | December 1996 | Whitley et al. |
| 5590382 | December 1996 | Kikinis et al. |
| 5592566 | January 1997 | Pagallo et al. |
| 5594658 | January 1997 | Lemaire et al. |
| 5594952 | January 1997 | Virtuoso et al. |
| 5600711 | February 1997 | Yuen |
| 5602456 | February 1997 | Cargin et al. |
| 5602908 | February 1997 | Fan |
| 5604491 | February 1997 | Coonley et al. |
| 5604492 | February 1997 | Abdul-Halim |
| 5604790 | February 1997 | Grimes |
| 5606594 | February 1997 | Register et al. |

| | | |
|---|---|---|
| 5615252 | March 1997 | Sizer, II et al. |
| 5625555 | April 1997 | Davis |
| 5625673 | April 1997 | Grewe et al. |
| 5625884 | April 1997 | Gitlin et al. |
| 5627875 | May 1997 | Kapsales |
| 5630205 | May 1997 | Ekelund |
| 5631950 | May 1997 | Brown |
| 5633782 | May 1997 | Krisher |
| 5633920 | May 1997 | Kikinis et al. |
| 5638540 | June 1997 | Aldous |
| 5644471 | July 1997 | Schultz et al. |
| 5644629 | July 1997 | Chow |
| 5648990 | July 1997 | Kraul et al. |
| 5651055 | July 1997 | Argade |
| 5654942 | August 1997 | Akahane |
| 5655006 | August 1997 | Cox et al. |
| 5659890 | August 1997 | Hidaka |
| 5661788 | August 1997 | Chin |
| 5664013 | September 1997 | Rossi |
| 5666495 | September 1997 | Yeh |
| 5666530 | September 1997 | Clark et al. |
| 5666553 | September 1997 | Crozier |
| 5668852 | September 1997 | Holmes |
| 5675524 | October 1997 | Bernard |
| 5678042 | October 1997 | Pisello et al. |
| 5687227 | November 1997 | Cohrs |
| 5689440 | November 1997 | Leitch et al. |
| 5689654 | November 1997 | Kikinis et al. |
| 5692038 | November 1997 | Kraus et al. |
| 5701258 | December 1997 | Harris et al. |
| 5703571 | December 1997 | Cannon et al. |
| 5703934 | December 1997 | Zicker et al. |
| 5712760 | January 1998 | Coulon et al. |
| 5712761 | January 1998 | Dials et al. |
| 5715524 | February 1998 | Jambhekar et al. |
| 5717741 | February 1998 | Yue et al. |
| 5719936 | February 1998 | Hillenmayer |
| 5727052 | March 1998 | Sizer, II et al. |

| | | |
|---|---|---|
| 5727053 | March 1998 | Sizer II et al. |
| 5742894 | April 1998 | Jambhekar et al. |
| 5742905 | April 1998 | Pepe et al. |
| 5745852 | April 1998 | Khan et al. |
| 5749071 | May 1998 | Silverman |
| 5751793 | May 1998 | Davies et al. |
| 5757279 | May 1998 | Fujiwara |
| 5760823 | June 1998 | Brunson |
| 5760824 | June 1998 | Hicks, III |
| 5761271 | June 1998 | Karnowski |
| 5764731 | June 1998 | Yablon |
| 5764747 | June 1998 | Yue et al. |
| 5784001 | July 1998 | Deluca |
| 5784444 | July 1998 | Snyder et al. |
| 5793416 | August 1998 | Rostoker |
| 5794116 | August 1998 | Matsuda |
| 5796806 | August 1998 | Birckbichler |
| 5797089 | August 1998 | Nguyen |
| 5798708 | August 1998 | Katayama |
| 5805981 | September 1998 | Sugio et al. |
| 5806005 | September 1998 | Hull |
| 5809415 | September 1998 | Rossmann |
| 5822402 | October 1998 | Marszalek |
| 5822727 | October 1998 | Garberg et al. |
| 5825048 | October 1998 | Arai |
| 5832435 | November 1998 | Silverman |
| 5841838 | November 1998 | Itoh |
| 5841850 | November 1998 | Fan |
| 5845202 | December 1998 | Davis |
| 5845282 | December 1998 | Alley et al. |
| 5848142 | December 1998 | Yaker |
| 5848356 | December 1998 | Jambhekar et al. |
| 5850435 | December 1998 | Devillier |
| H1772 | January 1999 | Akahane |
| 5857013 | January 1999 | Yue et al. |
| 5857016 | January 1999 | Jedlicka |
| 5864612 | January 1999 | Strauss et al. |
| 5878354 | March 1999 | Hasegawa |

| | | |
|---|---|---|
| 5881134 | March 1999 | Foster et al. |
| 5884186 | March 1999 | Hidaka |
| 5889852 | March 1999 | Rosecrans |
| 5894595 | April 1999 | Foladare et al. |
| 5896165 | April 1999 | Rao |
| 5896444 | April 1999 | Perlman et al. |
| 5903628 | May 1999 | Brennan |
| 5905778 | May 1999 | Tatchell et al. |
| 5907596 | May 1999 | Karnowski |
| 5907604 | May 1999 | Hsu |
| 5909647 | June 1999 | Hashimoto et al. |
| 5912697 | June 1999 | Hashimoto |
| 5926756 | July 1999 | Piosenka et al. |
| 5929771 | July 1999 | Gaskill |
| 5930700 | July 1999 | Pepper et al. |
| 5930701 | July 1999 | Skog |
| 5937050 | August 1999 | Yue et al. |
| 5943607 | August 1999 | Singer |
| 5950123 | September 1999 | Schwelb et al. |
| 5963876 | October 1999 | Manssen |
| 5966652 | October 1999 | Coad et al. |
| 5978451 | November 1999 | Swan et al. |
| 5987100 | November 1999 | Fortman et al. |
| 5991383 | November 1999 | Kucmerowski et al. |
| 5995596 | November 1999 | Shaffer et al. |
| 5995603 | November 1999 | Anderson |
| 5995666 | November 1999 | Nishio |
| 5999810 | December 1999 | Fuentes |
| 6002719 | December 1999 | Parvulescu et al. |
| 6005870 | December 1999 | Leung et al. |
| 6009082 | December 1999 | Caswell et al. |
| 6009308 | December 1999 | Matsuura |
| 6011953 | January 2000 | Foladare |
| 6026152 | February 2000 | Cannon |
| 6028921 | February 2000 | Malik |
| 6034621 | March 2000 | Kaufman |
| 6038443 | March 2000 | Luneau |
| 6049713 | April 2000 | Tran et al. |

CERTIFICATE OF CORRECTION (continued)
U.S. Pat. No. 8,160,221 B2

| | | |
|---|---|---|
| 6061560 | May 2000 | Saboorian et al. |
| 6067349 | May 2000 | Suder et al. |
| 6085079 | July 2000 | Tabeta |
| 6094574 | July 2000 | Vance et al. |
| 6097308 | August 2000 | Albert et al. |
| 6108200 | August 2000 | Fullerton |
| 6115588 | September 2000 | Nasuda |
| 6118994 | September 2000 | Usami et al. |
| 6128381 | October 2000 | Holmstrom et al. |
| 6134310 | October 2000 | Swan et al. |
| 6134320 | October 2000 | Swan et al. |
| 6151491 | November 2000 | Farris et al. |
| 6157318 | December 2000 | Minata |
| 6163274 | December 2000 | Lindgren |
| 6163691 | December 2000 | Buettner et al. |
| 6168331 | January 2001 | Vann |
| 6169904 | January 2001 | Ayala et al. |
| 6169911 | January 2001 | Wagner et al. |
| 6175741 | January 2001 | Alperovich |
| 6181366 | January 2001 | Dezonno et al. |
| 6181915 | January 2001 | Lewiner |
| 6181928 | January 2001 | Moon |
| 6184796 | February 2001 | Rivero |
| 6192218 | February 2001 | Laufmann et al. |
| 6192254 | February 2001 | Carlsen et al. |
| 6192257 | February 2001 | Ray |
| 6198916 | March 2001 | Martin |
| 6205213 | March 2001 | Kucmerowski |
| 6205321 | March 2001 | Rutledge |
| 6205332 | March 2001 | Novel |
| 6226367 | May 2001 | Smith et al. |
| 6226368 | May 2001 | Teich |
| 6226379 | May 2001 | Swan et al. |
| 6226665 | May 2001 | Deo et al. |
| 6229878 | May 2001 | Moganti |
| 6230003 | May 2001 | Macor |
| 6233315 | May 2001 | Reformato et al. |
| 6236971 | May 2001 | Stefik et al. |

CERTIFICATE OF CORRECTION (continued)
U.S. Pat. No. 8,160,221 B2

| | | |
|---|---|---|
| 6246430 | June 2001 | Peters |
| 6253061 | June 2001 | Helferich |
| 6266539 | July 2001 | Pardo |
| 6278862 | August 2001 | Henderson |
| 6282435 | August 2001 | Wagner et al. |
| 6327478 | December 2001 | Baker |
| 6335962 | January 2002 | Ali et al. |
| 6339639 | January 2002 | Henderson |
| 6351372 | February 2002 | Kim |
| 6377664 | April 2002 | Gerszberg |
| 6388560 | May 2002 | Parvulescu |
| 6393278 | May 2002 | Buchanan et al. |
| 6427064 | July 2002 | Henderson |
| 6430405 | August 2002 | Jambhekar |
| 6564070 | May 2003 | Nagamine |
| 6580784 | June 2003 | Rodriguez et al. |
| 6724867 | April 2004 | Henderson |
| 6751300 | June 2004 | Muller |
| 6757366 | June 2004 | Kaufman |
| 6766002 | July 2004 | Cannon |
| 6845398 | January 2005 | Galensky |
| 6940955 | September 2005 | Jones |
| 6961216 | November 2005 | Chan et al. |
| 6990180 | January 2006 | Vuori |
| 2001/0002209 | May 2001 | Han |
| 2001/0003538 | June 2001 | Sakata |
| 2002/0126814 | September 2002 | Awada |
| 2002/0186823 | December 2002 | Kikinis et al. |
| 2003/0099333 | May 2003 | Castagna et al. |

Foreign Patent Documents

| | | |
|---|---|---|
| 3315625 | Oct., 1984 | DE |
| 3329267 | Feb., 1985 | DE |
| 3421886 | Dec., 1985 | DE |
| 0 212 761 | Aug., 1986 | EP |
| 301740 | Feb., 1989 | EP |
| 9203891 | Mar., 1992 | EP |

CERTIFICATE OF CORRECTION (continued)
U.S. Pat. No. 8,160,221 B2

| | | |
|---|---|---|
| 0503813 | Sep., 1992 | EP |
| 0588571 | Mar., 1994 | EP |
| 0590500 | Nov., 1996 | EP |
| 0862342 | Feb., 1998 | EP |
| 0862342 | Feb., 1998 | EP |
| 0898407 | Feb., 1999 | EP |
| 0930593 | Dec., 2001 | EP |
| 1185068 | Jun., 2002 | EP |
| 1231762 | Aug., 2002 | EP |
| 2358065 | Feb., 1978 | FR |
| 2717975 | Jan., 1998 | FR |
| 2024567 | May., 1979 | GB |
| 2140253 | Nov., 1984 | GB |
| 2173071 | Oct., 1986 | GB |
| 2256113 | Nov., 1992 | GB |
| 2287856 | Mar., 1994 | GB |
| 2279203 | Dec., 1994 | GB |
| 146167 | Aug., 1983 | JP |
| 191541 | Nov., 1983 | JP |
| 58191541 | Nov., 1983 | JP |
| 90451 | May., 1984 | JP |
| 41358 | Mar., 1985 | JP |
| 77539 | May., 1985 | JP |
| 94547 | May., 1985 | JP |
| 178730 | Sep., 1985 | JP |
| 187141 | Sep., 1985 | JP |
| 186056 | Aug., 1986 | JP |
| 81821 | Apr., 1987 | JP |
| 8706421 | Oct., 1987 | JP |
| 65748 | Mar., 1988 | JP |
| 103526 | May., 1988 | JP |
| 46332 | Feb., 1989 | JP |
| 185035 | Jul., 1989 | JP |
| 1243655 | Sep., 1989 | JP |
| 246947 | Oct., 1989 | JP |
| 13050 | Jan., 1990 | JP |
| 294758 | Apr., 1990 | JP |
| 4225687 | Aug., 1992 | JP |

| | | |
|---|---|---|
| 4222145 | Sep., 1992 | JP |
| 4248742 | Sep., 1992 | JP |
| 5327859 | Dec., 1993 | JP |
| 08033016 | Jul., 1994 | JP |
| 0704827 | Apr., 1996 | JP |
| 08097935 | Apr., 1996 | JP |
| 09116619 | Feb., 1997 | JP |
| 10336316 | Dec., 1998 | JP |
| 11-220551 | Aug., 1999 | JP |
| 11261673 | Sep., 1999 | JP |
| 49930 | Feb., 2000 | JP |
| 0385604 | Mar., 2000 | TW |
| WO 90/13213 | Nov., 1990 | WO |
| WO 91/11889 | Aug., 1991 | WO |
| WO 9408421 | Apr., 1994 | WO |
| WO 94/13093 | Jun., 1994 | WO |
| 2296841 | Jul., 1996 | WO |
| WO 97/01252 | Jan., 1997 | WO |
| WO 0143475 | Jun., 2001 | WO |

Other References

Communication Base-Set With LCD Screen by Jonathan Carr et al, Jun. 1993. cited by examiner.
Intellect Brochure by Innovad, 1993. cited by examiner.
Messaging: A New Direction--Awash in E-Mail Troubles? A Raft of New Products is Coming to the Rescue, Network Computing, Oct. 1, 1996, pp. 58. cited by other.
Identafone Overview From Website, Dated Oct. 17, 1996. cited by other
Netpage Product Overview, NetPage, http://web.archive.org/web/19961221195506/http://www.net-pager.com/, Dec. 21, 1996, 2 pages. cited by other.
HP Teleshare: Integrating Telephone Capabilities on a Computer Workstation, Hewlett Packard Journal, Apr. 1, 1995, pp. 69. cited by other.
Hayes Europe's Smartcom Message Center Software, Newbytes News Network, Feb. 29, 1996. cited by other.
AT&T Makes Big Move in Digital Race, Los Angeles Times, Oct. 3, 1996, D-2. cited by other.
Faster Units Due in Stores Next Year, Computer Retail Week, Oct. 14, 1996, pp. 33. cited by other.
CDMA's March Continues, Newsbytes News Network, Aug. 19, 1996. cited by other.
AT&T First to Offer PCS Phones/New System Bundles Several Wireless Services, Newsday, Oct. 3, 1996, pp. A49. cited by other.
Diamond Ships Voice Modem With Internet Phone, Newsbytes News Network, May 18, 1995. cited by other.
Fax Software: Delrina Demos Winfax Pro 7.0 for Windows 95, Cambridge Publishing, 1995. cited by other.
New Modems: New Cardinal Voice-Capable Modems Offer Innovative Telephony; Cambridge Publishing, Inc., 1995. cited by other.
Toward Human Centered Design, vol. 96, Technology Review, Jul. 1, 1993, pp. 47. cited by other.
How the Europeans Respond to Mobile Communications, vol. 31, Communications News, May 1, 1994, pp. 28. cited by other.
Users Seek Alternatives to High Cellular Costs, vol. 12, Minneapolis-St. Paul City Business, Jun. 17, 1994, pp. 14. cited by other.
Voicenow is Hip-Pocket Answering Machine, USA Today, Apr. 5, 1995. cited by other.
Multimedia Messaging: AT&T Integrates Voice & Fax Messaging at Desktop, Cambridge Telecom Report, 1994. cited by other.
CID Technologies and Macpager Information, CID Technologies, Inc., Dec. 8, 1996. cited by other.
Opon: MCI to Provide Nationwide 'Find Me/Follow Me' Communications Service, Cambridge Publishing Inc., 1994. cited by other.
Private Eyed--Martyrware Private Eye, vol. 1.1, Product Overview, 1994. cited by other.
Little Brother Pager Notification Program With Caller ID, Product Overview, .COPYRGT. 1991-1994. cited by other.
CallerID Remote and Cidman V.1.29B, Product Overview, 1995. cited by other.
Callerinfo: V1.0 Caller ID TSR Program Product Description, Oct. 28, 1994. cited by other.
Pagemate: V3.3 Product Overview, Apr. 30, 1993. cited by other.
Calllink: V2.1 Caller ID for Windows Demo, May 17, 1994. cited by other.
Page on Call, V2.1, PC Program Overview, Jan. 28, 1994. cited by other.
Beepme V3.1, PC Program Overview, Aug. 22, 1993. cited by other.
Advantra Brochure, Enhanced Messaging Organizer-Premier, Texas Instruments, Jan. 1997. cited by other.
Advantra Brochure, Enhanced Messaging Organizer-Pro, Texas Instruments, Jan. 1997. cited by other.
Avigo10, The Intelligent Organizer, Texas Instruments--on the go, vol. 1, No. 1, Fall 1997. cited by other.
Active Data Product Catalog, Mar. 1993, p. 1, 2, 3, 5, 6. cited by other.
Apple PDA Prototype Makes Debut at CES, PC Week, Jun. 1, 1992. cited by other.
"Magic Cap Means Communication" brochure-1994. cited by other.
"Magic Cap" Brochure--1994. cited by other.

Mobile Office--Jan. 1994, vol. 5, No. 1, pp. 100-117, "Trio of Tomorrow" article, back cover, Evtek Corporation product advertisement, The Write Touch. cited by other.
PC LapTop Magazine,Feb. 1995, vol. 7, No. 2, pp. 28-48. cited by other.
It's NEW, May/Jun. 1995, vol. 1, No. 2, pp. 73-77. cited by other.
NTT DoCoMo Brochure, Apr. 1, 1995. cited by other.
Pen Computing Magazine, Aug. 1994, vol. 1, No. 1, pp. 15-22, 34-35. cited by other.
PC Pager Advertisement--1993. cited by other.
Computerworld, Dec. 21, 1992, p. 8, "Windows link to pagers aids LAN troubleshooters". cited by other.
Computer World, Aug. 2, 1993, vol. 15,Issue 31, p. 1. "Newton arrives sans remote links". cited by other.
Magic Cap Press Release, San Francisco, Jan. 6, 1994. cited by other.
Comdial Tracker brochure, 1994. cited by other.
Motorola Press Release, PCMCIA wireless modem technology announcement. cited by other.
Hewlett Packard Press Release, Infrared communications interface announcement, Jun. 1, 1993. cited by other.
Skytel Press Release--Jan. 6, 1994, "Skytel Corp. and General Magic work together to provide wireless mobile communications". cited by other.
Newton Message Pad 120, product brochure--1994. cited by other.
PC Magazine, Aug. 1993, "EO Falls Short AS Ultimate Handheld Communicator". cited by other.
T.A.V.I.S. Talk Product Brochure, Biztel Communication Systems, Inc. cited by other.
VS-401 TALKS SB product brochure. cited by other.
Mobile Office Magazine, Jan. 1994, p. 76, Fujitsu PCX numeric answering machine. cited by other.
PC World, Dec. 1992, Mobile Computing Section, pp. 239-265, "Nomads of the Nineties". cited by other.
Mobile Data Report, Feb. 1, 1994 v6 I2, Apple, Mobilecomm offer Newton, Pager Card, airtime deal. cited by other.
PC Week, May 23, 1994 v11 n20 pA1(2), A paging party. (growing trend towards one-way messaging). cited by other.
Teledynamics Catalog, Sep. 1994--Fans P161P Telesecretary Paging Device, pp. 25, 49, 51. cited by other.
General Magic Press Release, Feb. 8, 1993. cited by other.
Positive Communications "BEEPER" brochure, 1993. cited by other.
WinID Paging System--Software manual--v. 1.0, Nov. 15, 1994. cited by other.
AT&T EO 440 & 880 Personal Communicators brochure, 1993. cited by other.
PC Week, Feb. 12, 1990, They're Here: Portable E-Mail and Voice Mail. cited by other.
Ultravoice product brochure. cited by other.
TeleLink DS5000 advertisement--1993. cited by other.
PC Magazine, Jun. 15, 1993, "HP 100 LX Adds Remote E-Mail". cited by other INFOWORLD, Jun. 7, 1993, p. 34, "Omron readies PDA for release". cited by other.
INFOWORLD, Mar. 22, 1993, p. 4, "A failure to communicate: the long road to phone, PC integration". cited by other.
INFOWORLD, Feb. 22, 1993, p. 29, "Today's notebooks to gain telephony". cited by other.
INFOWORLD, Apr. 19, 1993, p. 1, "Microsoft, Intel team up to integrate phones, Pcs". cited by other.
INFOWORLD, Jun. 14, 1993, p. 30, "Third parties to enhance OmniBook 300's communications". cited by other.
INFOWORLD, Jun. 7, 1993, p. 43, "Card is all-in-one messenger". cited by other.
INFOWORLD, Jun. 7, 1993, p. 3, "Alliances give Newton PDA a communications advantage". cited by other.
MacWeek, Aug. 2, 1993, p. 63-68, "The MessagePad: Apple's first personal digital assistant". cited by other.
INFOWORLD, Jun. 28, 1993, p. 1, "General Magic's PDA interface comes to life with realistic objects". cited by other.
PC Magazine, Aug. 1993, p. 359-384, "Connecting Over the Airwaves". cited by other.
Electronic News, Sep. 28, 1992, p. 11, "Motorola has dual mode RF modem". cited by other.
Computer Retail Week, Nov. 16, 1992, p. 56, "Wireless messaging gets Windows version". cited by other.
Business Week, May 17, 1993, Electronic Messages from Phones, PC's, even Faxes. cited by other.
Telecomworldwire, Aug. 23, 1994, "Airnote pager filter to ship in North America". cited by other.
Telecomworldwire, Jun. 28, 1994, "Singtel adds pager into CT2 Phones Service". cited by other.
Global Communications, Sep.-Oct. 1992, v14 n5, p. 14, "Paging Taiwan". cited by other.
PC Week, Oct. 24, 1994 v11 n42 p. 109, "Voice of the Future". cited by other.
Motorola product brochure, "Marco Wireless Communicator", 1994. cited by other.
Vomax 2000 product brochure, 1992. cited by other.
PC World, Feb. 1993, "TyIN 2000 Communications System Ties Data, Fax, and Voice together". cited by other.
TyIN 2000 product brochure, 1993. cited by other.
DigiTrap Brochure, DTS-2040 product brochure, Nicollet Technologies 1994. cited by other.
Nicollet DigiTrap DTS-1082 product brochure, 1994. cited by other.
Telocator Network Paging Protocol (TNPP), v. 3.6, Oct. 20, 1993. cited by other.
Telocator Data Protocol (TDP), Jun. 12, 1993. cited by other.

Telocator Alpanumeric Protocol (TAP), v. 1.5, Jul. 21, 1994. cited by other.
Psion Series 3 Personal Information Management product brochure, Sep. 1993. cited by other.
Pagentry product brochure, 1992. cited by other.
Byte Magazine, Aug. 1994, p. 34, "IBM Plans Ambitious Network". cited by other.
Windows Source, Apr. 1994, pp. 106-138. cited by other.
San Francisco Examiner, Aug. 1, 1993, p. E16, "Newton arriving at last". cited by other.
Bellcore LSSGR ANI and ONI-FSD 20-20-0000, Issue 2, Mar. 1991. cited by other.
Bellcore LSSGR TR-NWT-000030 Issue 2, Oct. 1992. cited by other.
Bellcore LSSGR TR-NWT-000391, Issue 3, Sep. 1992. cited by other.
Bellcore LATA TR-NWT-000031, Issue 4, Dec. 1992. cited by other.
Motorola SiteMate product brochure--on-site voice paging system. cited by other.
Telecomworldwire, May 31, 1994, "IBM, Paclink launch new pager in Thailand". cited by other.
Newsbytes News Network, Apr. 11, 1994, "PageNet, Motorola work on advanced pager". cited by other.
Newsbytes News Network, Mar. 2, 1994, "PCMCIA Card combines wireless pager / wired fax modem". cited by other.
Newsbytes News Network, Dec. 21, 1993, PageCard to double as PCMCCard/Standalone pager. cited by other.
Computergram International, Dec. 20, 1993, 12322, "Motorola unveils the memo express pager". cited by other.
Newbytes News Network, Dec. 22, 1993, Japan--AT&T intros videophone, Motorola plans voice pager. cited by other.
Edge, Nov. 14, 1994, v9 1329, "Paging: Lotus ships lotus notes pager gateway 1.1 gateway supports multiple paging vendors". cited by other.
Telecommunications (TL), Report on AT&T, Nov. 21, 1994 v12 123, "AT&T Focuses on regular text messaging as pager money-maker". cited by other.
Telecomworldwire, Oct. 7, 1994, "NEC introduces super 'Know-everything' pager into UK Market". cited by other.
HFD-The Weekly Home Furnishings Newspaper, Jan. 31, 1994 v68 n5 p. 92. cited by other.
StatelLite Communications, Sep. 1992 v16 n9 p. 29(4). cited by other.
PageMaster paging application--Software help manual--v. 1.4, 1995. cited by other.
Executive Page v. 1.2--Software manual--1993, 1994. cited by other.
CALLLink for Caller ID v. 2. 1--Software manual--Digital Systems Group, Inc., 1994. cited by other.
The Business Journal, Oct. 14, 1994 v14 n50 p. 27, "Wireless message pad among new products". cited by other.
Communications Daily, Jan. 30, 1991 v11 n20 p. 5. cited by other.
PC Week, Sep. 20, 1993 v10 n37 p. 41. cited by other.

Communications International, Jul. 1994 v21 n7 p. 16(2). cited by other.
InfoRad AlphaPage software advertisement, Dec. 1992. cited by other.
Mobile Data Report, Sep. 26, 1994, v6 l19, "Casio introduces nationwide availability of organizer-pager". cited by other.
PC Laptop Computers Magazine, Apr. 1993, vol. 5, No. 4, pp. 31, 61-63. cited by other.
Motorola brochure, "Wrist Watch Pager", 1990. cited by other.
Communications Daily, Mar. 8, 1994 v14 n45, p. 3. cited by other.
Radio, Computer & Telephone Corp. PocketOffice brochure, v. 1.0, Jun. 1993. cited by other.
BellSouth Product Brochure, Simon, 1994. cited by other.
How to Appease a Fat Cat From a Gondola, Mobile Office, Undated, pp. 29, 1 PAGE, possibly circa 1993-1994. cited by other.
How to Stay on Top of Your Business, No Matter Where You Are, EO, Inc./AT&T Brochure, Undated, 4 PAGES, possibly circa 1993-1994. cited by other.
ANI Update, Fall 1991. cited by other.
Caller ID Service Attracts About 4000 Initial Subscribers, Business, Feb. 26, 1994, Front Page. cited by other.
ATDI 3000 Owner's Guide, Undated. cited by other.
Enhanced Messaging Service White Paper, Dec. 1992. cited by other.
Simon--User Manual, Bell South 1994. cited by other.
Beepme V3.1 Call Your Pager, Aug. 22, 1993. cited by other.
Dear Potential Client Letter, Biztel Communications Systems, Inc. cited by other.
Bouncer by SNI Innovation Brochure, 1992. cited by other.
Bouncer by SNI Innovation Brochure--Your Personal Telephone Secretary. cited by other.
Caller If With Digital Voice, Bel-Tronics Limited Brochure, 1994. cited by other.
A Rocket in its Pocket, Business Week, Sep. 9, 1996, p. 111-114. cited by other.

Peter on, Frequently Asked Questions About Caller-ID, v1.1, Mar. 1994. cited by other.
Caller-ID, ANI, DNIS, and DID, CallerID.HTM At WWW.STYLUS.COM, Oct. 23, 1997. cited by other.
Pocket Organizer, IP800 Ower's Manual, Casio 1994. cited by other.
Callman Model CM3 Brochure, Undated. cited by other.
Caller ID Option to Become More Attractive During '95, Twice CES Daily, Jan. 8, 1995, pp. 36-40. cited by other.
Casiopeia by Casio Brochure, 1996. cited by other.
Computer Link--PC Link Plus & Casio Link Brochure by Casio, Traveling Software Inc., 1991. cited by other.
Caller-ID Pro 1.2, 1996. cited by other.
Multi-Line Adapter Model 20040--Caller ID MGMT System by Rochelle Communications, Inc., Jul. 1992. cited by other.

Callman Brochure, Westlink Systems Corp., Undated. cited by other.
Callman Model CM2 Brochure, Westlink Systems Corp., Undated. cited by other.
Take Back Control of Your Telephone, Electronics Now, Jul. 1994. cited by other.
Rochelle's Caller ID Quest, Teleconnect, Apr. 1994, p. 22. cited by other.
Commail 1.3—Caller ID Voice Mail for Windows 95/98, From HTTP://CREWS-NET.COM/COMMAIL, Sep. 17, 2000. cited by other.
Alphanumeric Paging Advertisement, From HTTP://WWW.ONTHEWWW.COM/PAGING/OPTIONS/SHTML, Sep. 17, 2000. cited by other.
Callinfo: V.1.0 Caller ID, Oct. 28, 1994. cited by other.
Creative Technologies in Modem, Phone Business, Your Document, Mar. 27, 1995. cited by other.
File Info for CIDRP.CPT, CallerID Remote 1.0.2P, Sep. 14, 1995. cited by other.

Phreaking Caller ID and ANI, Consumertronics, 1993. cited by other.
Caller ID Could Spur Telephone Link Over Cable, Multichannel News, Apr. 18, 1994, p. 40. cited by other.
Principles of Caller ID, International Micropower Corporation, 1992. cited by other.
Caller ID Availability Map, BYTE, Jan. 1995. cited by other.
Caller ID Goes to Work, BYTE, Jan. 1995. cited by other.
Truespeech 6.3, 5.3, 4.8 KBPS Algorithm, DSP Group, Inc., Apr. 1995. cited by other.
Truespeech 8.5 KBPS Algorithm, DSP Group, Inc., Mar. 1995. cited by other.
Boca Research Sound Expression 28.8 SRS, Your Document, 1996. cited by other.
Execpage: V1.2.0108 Windows Paging Module, Jun. 16, 1995. cited by other.
The Top 10 Innovative Products for 2006: Technology With a Human Touch, The Futurist, Jul.-Aug. 1996, p. 18. cited by other.
Infotrac—National Newspaper Index, 1990-Jan. 1993. cited by other.
Glenayre Provides MVP System to Pennsel Communications Services, Glenayre News, Oct. 3, 1996. cited by other.
Glenayre Successfully Activates Complete Inflexion Voice Messaging System, Glenayre News, Sep. 3, 1996. cited by other.
Glenayre Launches Wireless Messaging Standard on Internet, Glenayre News, Aug. 8, 1996. cited by other.
News Release Transmitted by Canadian Corporate, Jul. 26, 1995. cited by other.

HFN Buyers' Guide, Jan. 1, 1996. cited by other.
A New Name in Pagers, Consumer Electronics, Jan. 13, 1997, p. 161. cited by other.
Hotpage by Smith Micro Software Brochure, 1997-1998. cited by other.
Hayes Office Communications Manager—This Modem is Truly Connected, 1996 CMP Media, Inc. cited by other.

Why Just Get a Page, Intellect, 1993. cited by other.
Intellect Brouchure by Innovad, 1993. cited by other.
Bulletin Board—Q&A—Inc. Tech 1997, No. 3. cited by other.
Intellilink Brochure, 1993-1994. cited by other.
Intellect by Clearwave Communications, Inc., New Product Announcement. cited by other.
Always in Touch Relays Caller IDs to Pagers, Mobil Computing and Communications, May 1997. cited by other.
Communications Abilities let Newton Make the Exchange, MacWeek, Aug. 2, 1993. cited by other.
Spoken Caller ID Trial In Baltimore is First Cellular--Based Test of Its Kind, Mobile Phone News, Dec. 20, 1993, V11, N48, p. 3(2). cited by other.
Monologue User Manual by Media Vision, 1992. cited by other.
FCC Auction to Push Paging and Messaging, Telephony, Jul. 25, 1994 V227 N4 p. 8(1). cited by other.
"PCIA 1995 Forecasts" PDA Developers 3.3, May/Jun. 1995, pp. 4-5. cited by other.
"PCS Frequently Asked Questions" PCIA, 1996. cited by other.
"Court Approves Caller ID Without PUC Restrictions" The Recorder, Feb. 1, 1996, p. 2. cited by other.
Pager Codes Brochure by Reo Enterprises, 1993-1994. cited by other.
Pocketalk Brochure by Conxus, 1998. cited by other.
"Pager Patterns" Dealerscope First of the Month, Jan. 1994, p. 32. cited by other.

"1997-A New Page" Consumer Electronics, Jan. 1997, p. 10. cited by other.
"Wireless Watch" PDA Developers 3.4, Juuang 1995, pp. 5-6. cited by other.
"Product Announcements" PDA Developers 3.2, Mar./Apr. 1995, pp. 3-4. cited by other.
"Wireless Watch" PDA Developers 3.2, Mar./Apr. 1995, pp. 6-8. cited by other.
Reviews and Previews, PDA Developers 3.2, Mar./Apr. 1995, pp. 9-12. cited by other.
"The Simon Personal Communicator" PDA Developers 3.2, Mar./Apr. 1995, pp. 13-16. cited by other.
"Wireless Watch" PDA Developers 2.6, Nov./Dec. 1994, pp. 4-5. cited by other.

"Wireless Data Services: Here and Now" PDA Developers 2.6, Nov./Dec. 1994, p. 32-34. cited by other.
"6 Firms to Unveil High-Tech Alliance" San Jose Mercury News, Feb. 8, 1993, Front Page. cited by other.
Work Ready Brochure by Smith Corona, 1997. cited by other.
"AT&T'S Vision for Mobile Computing". cited by other.
Skyword Advertisement by Skytel, 1993. cited by other.
"Putting Email Into Your Pocket" Mobile Computing & Communications, Dec. 1998, p. 50. cited by other.
Shareview 3000 Brochure by Sharevision, 1994. cited by other.
"Two-Way Pagers: The Next PDA?" BYTE, Jan. 1996. cited by other.

"Multimedia: Sierra Announces Fully-Concurrent Sound, Data, Fax &"
Cambridge Work-Group Computing Report, 1995. cited by other.
Simon By BellSouth Cellular Corporation and IBM, 1994. cited by other.
"Speedybase" Telephone Products, Jul. 3, 1994. cited by other.
Skytel and the Sony Magic Link Pager Card, Skytel Corporation, 1994. cited by other.
Caller Eyedec Features, 2001. cited by other.
Caller ID and ANI Primer, CTI Magazine, Feb. 97, vol. 2, No. 2, p. 52. cited by other.
Telcomp, Inc. Caller ID (ANI) Frequently Asked Questions, 1996. cited by other.
"MCI to Build Local Phone Networks" San Jose Mercury News, Jan. 5, 1994. cited by other.
"Wallet Terminal Keyboard With Acoustic Coupler" IBM Technical Disclosure Bulletin, Aug. 1967, pp. 188-189. cited by other.
"Electronic Reference Devices are Enjoying Greater Respect in the Marketplace" Dealerscope-Merchandising, Jun. 1992, p. 120. cited by other.
Alphanumeric Paging Brochure by Pactel Paging, 1992. cited by other.
Voice Express.Service by Pactel Paging, 1992. cited by other.
The Casio IP800 Brochure, 1994. cited by other.
"Phones, PCS, Is Managers Converge to Bring More Services" Infoworld, May 17, 1993, p. 4. cited by other.
Metromedia, Alpha-Numeric Display Pager-Undated. cited by other.
Sony Launches First Personal Communicator Based on General Magic Software Technologies, Announcement Sep. 28, 1994. cited by other.
"Office to Go" PC Laptop Computers Magazine, Apr. 1993, pp. 28-34. cited by other.
"Keeping in Contact" PC Laptop Computers Magazine, Apr. 1993, pp. 36-42. cited by other.
Buyers Guide, PC Laptop Computers Magazine, Apr. 1993, p. 61. cited by other.
"Palmtops, Pens & Portables" PC Laptop Computers Magazine, Apr. 1993, pp. 80-81. cited by other.
"Laptop Office" PC Laptop Computers Magazine, Apr. 1993, pp. 84-87. cited by other.
"Compuserve's E-mail-to-Pager Communication Helps Users Get Information Anytime, Anywhere" The Compuserve Information Service, Mar. 6, 1996. cited by other.
EIA/TIA Standard.ltoreq.Mobile Station--Land Station Compatibility Specification, Sep. 1989. cited by other.
Quick Start Guide, CD USA, 1997. cited by other.
User Manual, Phonedisk, Mar. 1995. cited by other.
"Shareview Transforms Phones" Inforworld, Feb. 1993. cited by other.
Universal Remote Controls Advertisement by Aikotec Corporation, Telecom Sources, Oct. 1995, p. 158. cited by other.
N-1 Numeric Pager by GSL, Telecom Sources, Oct. 1995, p. 265. cited by other

CERTIFICATE OF CORRECTION (continued)
U.S. Pat. No. 8,160,221 B2

"Pagenet's Voicenow Due in N. Cal., Nev." HFN, Apr. 14, 1997, p. 168. cited by other.

"Caller ID Going National; Suppliers Eye Good Year" Twice CES Daily, Jan. 5/7, 1996. cited by other.

Teledynamics Product Booklett, pp. 1-2, Jan. 3, 1994. cited by other.

Skytel Message Center--"This Page Lets you Sneak Out of the Office"--Business Week, Sep. 20, 1999, p. 138G. cited by other.

NEC Beacon Data Pager Advertisement. cited by other.

Bellsouth Interactive Paging Advertisement. cited by other.

Digital Palm Pilot Phone--Pen Computing, Feb. 1998. cited by other.

Sony MD-7001 Alphanumeric Pager Advertisement. cited by other.

"Audiovox Plans Combo Phone/PDA" RCR Wireless News, Feb. 26, 2001. cited by other.

"Streaming Technologies Gather Momentum in Wireless Space" RCR Wireless News, Feb. 19, 2001. cited by other.

Panasonic GD93 Advertisement. cited by other.

Motorola Accompli 009 Personal Communicator, Celebrated Living, Spring 2001. cited by other.

Tech-Know PDAS, American Way, Jan. 15, 2001. cited by other.

Skytel Messaging Pager Advertisement. cited by other.

Texas Instruments Organizers Brochures. cited by other.

The Leader in Caller ID Technology, Telecom Sources, Oct. 1995, p. 191. cited by other.

Fast Automatic Name/Number Systems Brochure, Jan. 1995. cited by other.

Fans Callscreener, Telesecretary Owner's Manual, Undated, pp. 1-27, possibly circa Sep. 1994. cited by other.

Fans Callscreener Brochure, CES Show Jun. 1993. cited by other.

"US West Requests Ok for Pioneer Wireless Testing," Newbytes News Network, Jul. 30, 1991. cited by other.

AT&T Ships Passageway, Newsbytes News Network, Feb. 5, 1993. cited by other.

Caller ID is Taking to the Road, The Record, Nov. 16, 1993, p. 16. cited by other.

On Time Gets Wireless Links. Newsbytes News Network, Feb. 5, 1993. cited by other.

"Intel Users not Getting Much Satisfaxtion" Newsbytes News Network, Apr. 10, 1991. cited by other.

"Digital Service Launched Over Lucent Technologies Equipment" Lucent Technologies Press Release, Jul. 8, 1997. cited by other.

"Technology: A Portable Office That Fits in Your Palm Cellular Phones, Faxes and E-Mail are all Coming Together in a Clever Batch of Hand-Held Computers" Time, 2, 15, 1993, p. 56. cited by other.

"PCS '97: New Wireless Phone Offers Access to Advanced PCS Features" Lucent Technologies/Bell Labs, Press Release, Sep. 10, 1997. cited by other.

"Wireless Talking Caller ID" Lucent Technologies, 2000. cited by other.

FCC Registraion for Very Early Caller ID Product, Aug. 1994. cited by other.
"Lucent Technologies Introduces New Portfolio of Enhanced Services for Wireless Carriers" Lucent Technologies Press Release, Feb. 29, 2000. cited by other.
"Lucent Technologies Makes Computer-Telephony Easy; Announces First PC-Based, Multi-Phone System With no Rewiring" Lucent Technologies, Mar. 4, 1997. cited by other.
"Wireless Calling Name" Lucent Technologies, 2000. cited by other.
Contact Managers and PIMS, Computer Dealer News, Mar. 23, 1994, p. 50(2). cited by other.
Rochelle Offering Caller ID Applications, Newsbytes News Network, Mar. 7, 1994. cited by other.
"Caller ID Product Explosion Coming" Computer Telephony Magazine, Apr. 1, 1995, p. 44(2). cited by other.
Puma Technology Ships Intellilink Software to Extend the NEC Beacon Data Pager to PC-Based Applications; Puma Intellilink Software Makes Smart Pager a Powerful PC Companion, Business Wire, Jun. 12, 1998. cited by other.
"Spending: How to be as Smart as Your Phone" Money, Jan. 1, 1991, p. 122. cited by other.
Abate marco, Antono ff, The Future is Now--Interview W/AT&T Consumer Products Div. President Carl S. Ledbetter, vol. 246, Popular Science, Jan. 1, 1995, pp. 68(8), reprinted from eLibrary. cited by other.
"New for PC: $79 Caller ID Device" Newbytes News Network, Feb. 27, 1992. cited by other.
Internal Research Results of FCC Applicant Query. cited by other.
New Release: McCaw Cellular Has Nation's First Wireless Caller ID Serice, Feb. 27, 1995. cited by other.
"Information Technology: The Wired Executive Savings Time Around the Clock" Fortune, Dec. 13, 1993, p. 157. cited by other.
Wireless Market Players Team on New Palmpilot Paging Device, Mobile Matters, Dec. 1, 1997. cited by other.
Information Technology: Look, Ma! No Wires!, Fortune, Dec. 13, 1993 p. 147. cited by other.
"Comdex--Galvin Keynote Pitches Motorola Technology" Newbytes News Network, May 25, 1994. cited by other.
"Novell Intros Perfect Works 2.1 for Windows" Newsbytes News Network, Apr. 4, 1995. cited by other.
"Software Converts E-mail Text to Voice" Newsbytes News Network, May 25, 1995. cited by other.
"Windows 95 "Coming Soon" Program is . . . Coming Soon" Newsbytes News Network, Jul. 13, 1995. cited by other.
"Ontime Scheduler Adds Phone Integration" Newsbytes News Network, Jun. 6, 1994. cited by other.
"CTI: Bell Atlantic & Octus Collaborate to Integrate Computers & Telephones" Cambridge Work-Group Computing Report, Oct. 24, 1994. cited by other.
"CTI: Phoenix Telephony Suite Provides PCS for Small & Home Offices With"

Cambridge Work-Group Computing Report, Jun. 19, 1995. cited by other.
"Symantec Offers Free Telephony Add-in for Act!" Newsbytes News Network, Mar. 8, 1995. cited by other.
"New PC: AT&T Intros the Globalyst 360TPC. First PC With True AT&T" Cambridge Work-Group Computing Report Aug. 29, 1994. cited by other.
"Windows 95'S New Goodies" Newsbytes News Network, Oct. 21, 1994. cited by other.
PCS: Technology With Fractured Standards, Electronic Design, Feb. 6, 1995, p. 65. cited by other.
"Priority's "One Number Service" for Paging/Phone/Fax" Newsbytes News Network, Nov. 23, 1994. cited by other.
"A Roundup of Hot Games, Gadgets & Gizmos From the Consumer Electronics Show Stay Tuned . . . " Newsday, Jul. 21, 1994, p. B29. cited by other.
"Connect2Voice Reads Your E-Mail to you" Newsbytes News Network, Sep. 26, 1995. cited by other.
"Apple's Geoport Demonstrated by VP AL Gore" Newsbytes News Network, Mar. 3, 1994. cited by other.
"Online to a Revolution the Amazing- and Some Say Ominous--New World of TV, Telephone and Computer is Heading Your Way" Newsday, Jul. 18, 1993, p. 4. cited by other.
"New for PCS: Board and Software Work With Caller ID" Newsbytes News Network, May 11, 1992. cited by other.
"Comdex: High-End Caller ID Handler Announced for PC'S" Newsbytes News Network, Apr. 9, 1992. cited by other.
"Supra Intros New V.32 Data/Fax Modems" Newsbytes News Network, Feb. 7, 1992. cited by other.
"Comdex Preview: PCMCIA Modems" Newsbytes News Network, Nov. 13, 1992. cited by other.
"Comdex: Single Board Provides Fax/Modem/Answerphone" Newsbytes News Network, Oct. 24, 1991. cited by other.
"Comdex: Windows Caller ID System Announced" Newsbytes News Network, Oct. 25, 1991. cited by other.
"Moscow: Computer Answering Machine" Newsbytes News Network, Apr. 4, 1991. cited by other.
"Technology: A Portable Office That Fits in Your Palm Cellular Phones, Faxes and E-Mail are all Coming Together in a Clever Batch of Hand-Held Computers" Time, Feb. 15, 1993, p. 56. cited by other.
Wireless Manners Needed More Than Ever, Business Wire, May 3, 1999. cited by other.
Brace Yourself for Some Major Advances, Internetwork, Jan. 2, 1997, p. 28(2). cited by other.
"Northern Telecom: Nortel Announces Two New Digital Wireless Handsets With First-to-Market Features" Presswire, Aug. 26, 1997. cited by other.
"Cover Story/Small Wonders" Newsday, Dec. 1, 1996, p. F08. cited by other.
"AT&T Offers Digital PCS Service in 40 Markets" Reuters Business Report, Oct. 2, 1996. cited by other.

Four Bells Posts Strong Profits on Wave of Demand, Rueter's Business Report, Jan. 21, 1997. cited by other.
"Caller ID Service Now Available to Most Airtouch Cellular Customers in Oregon" Business Wire, May 18, 1998. cited by other.
Ericsson: Wins $17 Million Contract From APC For PCS Phone; First PCS, Cambridge Telecom Report, Aug. 21, 1995. cited by other.
AT&T Goes Nationwide With PCS, Dallas Morning News, Oct. 3, 1996, p. 11. cited by other.
"Caller ID: Skytel Confirms Apr. 15 Nationwide Launch of Caller ID" Cambridge Telecom Report, Apr. 20, 1998. cited by other.
Caller ID--R.I.P., Guest Editorial, Newsbytes New Network, Apr. 30, 1993. cited by other.
"Regulators Vote to Review Caller ID" The Record, Jan. 23, 1993. cited by other.
"Southwestern Bell Fights Caller ID Ban in Texas" Newsbytes News Network, Feb. 10, 1993. cited by other.
"Caller ID on Phone Horizon--Controversial Service Shows Call Origination" Wisconsin State Journal, Dec. 3, 1993, p. 7C. cited by other.
"Caller ID Service to Debut Next Week" St. Louis Post-Dispatch, Jul. 2, 1993, p. 05B. cited by other.
"Caller ID Service in Trouble?" Newsbytes News Network, Mar. 24, 1992. cited by other.
"Caller ID Spreading Nationwide" Newsbytes News Network, Nov. 23, 1992. cited by other.
Invasions of Privacy, St. Louis Post--Dispatch, Jul. 14, 1993, p. 06B. cited by other.
"Caller ID Moves Ahead in Indiana" Newsbytes News Network, Feb. 14, 1992. cited by other.
"Pacific Bell Caller ID Just Got Better--CPUC Approves Name Enhancement" Business Wire, Mar. 16, 1993. cited by other.
FCC Database Research for Caller ID--ID Paging. cited by other.
US West Paging Addresses Travelers' Needs, Weekly Home Furnishing News, Jul. 26, 1993, p. 69. cited by other.
Michael Bayer, Computer Telephony Demystified, .COPYRGT. 2001. cited by other.
Newton's Telecom Dictionary, pp. 143. cited by other.
"Lines Between Phones, PDA'S Blur" RCR Wireless News, Sep. 10, 2001, p. 3. cited by other.
"Microsoft Releases Details of Pocket PC OS Upgrade" RCR Wireless News, Sep. 10, 2001, p. 3. cited by other.
Philips Home Services Brochure, "The Next Logical Step" 1994. cited by other.
Philips Home Services Brochure, "The Next Generation Telephone" 1994. cited by other.
Octus PTA Brochure, 1994. cited by other.
"Sprint Venture Picks AT&T Network Systems, Northern Telecom as Vendors" Press Release by Lucent Technologies, Feb. 1, 1996. cited by other.

"AT&T Announces Major Restructuring for 21.sup.st Century" Press Release, Sep. 20, 1995. cited by other.
Systems and Technology Company Headquarters--Press Release, Nov. 20, 1995. cited by other.
Integrated Messaging Capability, Press Release Feb. 1, 1995. cited by other.
"AT&T Introduces Compact Portable Cellular Flip Phone" Press Release, Jan. 6, 1995. cited by other.
AT&T Demonstrates PCS Spectrum CDMA At Wireless '95 Tradeshow, Press Release, Feb. 1, 1995. cited by other.
"Wireless and Wireline Convergence" Bell Labs Technical Journal, Summer 1997. cited by other.
Definiton of Pager From APDG Telecom Books, Nov. 9, 2001. cited by other.
Definition of PDA From APDG Telecom Books, Nov. 9, 2001. cited by other.
"GTE Introduces Digital CDMA Wireless Service in Austin, Texas . . . " Press Release, Nov. 15, 1996. cited by other.
"GTE Launches CDMA Wireless Service in California" Press Release, Mar. 3; 1997. cited by other.
"AT&T to Introduce New Wireless Intelligent Network Platform" Press Release, Jan. 23, 1995. cited by other.
National Alliance Places First CDMA Calls on PCS System, Press Release, Oct. 31, 1995. cited by other.
GTE MobilNet Using AT&T Gear For CDMA Market Trial In Texas, Press Release, Jan. 30, 1995. cited by other.
"IV. Basic Wireless Principles" New York Times, Aug. 19, 1996. cited by other R.C. Levine, Digital Switching, Lecture, Apr. 21, 1998. cited by other.
AT&T Digital PCS, White Paper, May 1997. cited by other.
Wireless AT&T Digital PCS Service Launched Nationwide, News Release, Oct. 2, 1996. cited by other.
Narrowband PCS Nationwide Auction Winners, Aug. 17, 1994. cited by other.
Public Notice: High Bidders in Auction of Regional Narrowband Licenses, Nov. 9, 1994. cited by other.
Jackson et al., "SS7 and BB King" Primedia Business Magazines & Media, Inc., Mobile Radio Technology, May 1, 1999. cited by other.
Skytel Offers Prepaid Alpha Paging Package, Business Wire, Aug. 18, 1998. cited by other.
What's Hot: What Number, Please?, Information Week, Jun. 16, 1997. cited by other.
Fast and Furious: Advanced Image Comm Futuremail, Network Computing, Apr. 15, 1998, p. 168. cited by other.
CDMA: CDMA Development Group Created, Cambridge Telecom Report, Aug. 15, 1994. cited by other.
You Got PDA on My Cellphone, Oct. 2, 2000. cited by other.
"New Products" Wireless Review, Nov. 1, 1998. cited by other.
Definition--"Advent" From Mariam-Webster's Collegiate Dictionary. cited by other.

"Signaling System No. 7, IS-41 and Cellular Telephony Networking" Proceedings of the IEEE, vol. 80, No. 4, Apr. 1992. cited by other.
Answering Machine With Automatic Obtainment and Usage of Caller ID, Sep. 1997. cited by other.
Look Who's Calling, Wireless Review, Feb. 1, 2000. cited by other.
The Value-Add Appeal, Wireless Review, Sep. 15, 1999. cited by other.
Freudenrich, How Personal Digital Assistants (PDAS) Work, http://www.howstuffworks.com/pda.htm/printable, Dec. 5, 2001, pp. 1-18. cited by other.
Apple Mobile Message System, p. 74, Sep. 1995. cited by other.
Official Gadgeteer Hands on Review: Kyocera QCP 6035, 2001. cited by other.
Going Global, History of GSM, Oct. 8, 1999. cited by other.
Growing and Growing, History of GSM, Oct. 8, 1999. cited by other.
Caller ID Fact Sheet, Mar. 1997. cited by other.
Metrocall, Inc. Discloses Plans to Launch Exclusive New Messaging. . . , Mar. 1998. cited by other.
Skytel Service Pricing and Options, Jan. 14, 2002. cited by other.
Ericsson Chatboard, 2001. cited by other.
Full Size QWERTY Keyboard for Smart Phone, Kyocera. cited by other.
Next Messaging an Introduction to SMS, EMS and MMS, Mobile Streams LTD, www.NextMessaging.com, Jan. 2, 2001, 25 pages. cited by other.
Skypager Advertisement, 2000. cited by other.
Message Center Faqs, Skytel.com. cited by other.
Executive Summary by the Strategis Group Outlining Marketing Research, 2000. cited by other.
Advanced Messaging to Boost Paging Revenues the Strategis. . . , Jan. 2000. cited by other.
The Future of Paging (Part 11--1998 and Beyond). cited by other.
Caller ID; Skytel Confirms, Apr. 15, 1998. cited by other.
Success 4 SMS, Mobil Streams White Paper, p. 17, Feb. 2001. cited by other.
Wireless Communications Glossary, 1997-2001. cited by other.
The Short Message Service, GSM World, Jun. 2001. cited by other.
Chart Entitled The GSM Milestones states, first PCS, 1995. cited by other.
Chart Entitled The GSM Milestones . cited by other.
Integrated Messaging Capability on AT&T Analog Cellular Phones, Lucent Technologies, Feb. 1, 1995. cited by other.
GSM Growth and Forecast to Dec. 2001. cited by other.
Short Message Service Center. cited by other.
GTE MobilNet's CDMA Trial, Press Release, New Technology, 1994. cited by other.
Short Message Service Center, Lucent Brochure, 1999. cited by other.
Keyword Search Performed on Motorola Website, 1993-1996. cited by other.
Keyword Search Performed on Motorola Website for Caller ID, 1993-1996. cited by other.
Keyword Search Performed on Motorola Website for Caller ID and Pager. cited by other.

The Future of Paging (Art II-1998 & Beyond), Oct. 1998. cited by other.
Handspring Expertly Combines Cellphone, PDA in New Treo, 2001. cited by other.
Intelligent Phone, IBM Technical Disclosure Bulletin, Feb. 1981. cited by other.

Bellis, M., Selling the Cell Phone--PCS Technology, http://inventors.about.com/library/weekly/aa072199.htm, Jul. 21, 1999, 3 pages, printed Mar. 10, 2002. cited by other.
Wireless Data Cover Cellular and PCS, ASI/Price Waterhouse conference on wireless data, Mar. 27, 1997. cited by other.
Nelson, The Simon Personal Communicator, PDA Developers 3.1, Mar./Apr. 1995. cited by other.
CDMA Short Message Service Application, Version 1.0 Aug. 22, 1994. cited by other.
Communication Base--Set with LCD Screen, Motorola Inc. Jun. 1993. cited by other.
CDMA Development Group Completes Specifications for Data and Short Message Services, Oct. 26, 1994. cited by other.
Messaging Card and Newtonmail: We Pick Up and Deliver, Newton Notes 1993. cited by other.
Wireless Caller ID, Message Waiting Now in Washington State, Oct. 23, 1995. cited by other.
Calling Number Identification Services State 1 Description, Apr. 5, 1994. cited by other.
XIII The Digital Control Channel (DCCH) in IS-136, Telecomwriting.com: Digital Wireless Basics: Radio Principles: IS-136 Channel, www.privateline.com/PCS/IS-136CHANNELS.HTM, Apr. 15, 2002, pp. 1-6. cited by other.
New Micro-Portable 3770 Cellphone with LCD Display from AT&T, Nov. 7, 1994. cited by other.
GTE MobilNet To Test CSMA Cellular Digital Switching in Austin, 1995. cited by other.
Southwestern Bell and AT&T to Test TDMA Wireless System, Mar. 1, 1994. cited by other.
Price Cuts: US West Cellular Reduces And Simplies Rates, Jul. 4, 1994. cited by other.
US West Cell Phone, PC Link, Jul. 1, 1993. cited by other.
New CDMA ASYNC Data/Message Spec, Oct. 31, 1994. cited by other.
Consumer Electronics Show: IBM Cellular Phone/PC, Jan. 1993. cited by other.
Bell Two--Way Paging is World's First, Bell Mobility Service From Bell Mobile Communications, Inc., Apr. 16, 1994. cited by other.
TCA Show: New Products and Voice Mail Integration, Sep. 24, 1992. cited by other.
Mobilcomm Voice Organizer Pager Brochure, 1996. cited by other.
An Introduction to Paging, By Motorola, 1993. cited by other.
Caller ID Signaling and Data Format, Byte, Jan. 1995. cited by other.

Pagers, Dime (Japanese General Magazine), Dec. 15, 1994. cited by other.
Flex: The Mark of Leadership, Motorola, 1995. cited by other.
Pagewriter by Motorola, 1996. cited by other.
Motorola Announces Inflexion, Motorola, 1995. cited by other.
NEP Communications Advertisement. cited by other.
"Keynote Voice Memory" Motorola, 1996. cited by other.
Nexus Two-Way Paging Brochure, Telecommunication Systems, Ltd. cited by other.
Fonesync Software Advertisement. cited by other.
"Telecraft's Pocket Faxxer is a Slicer-Dicer Among Peripherals" Computer Shopper, Jul. 1993. cited by other.
Octus PTA, Version 1.54 Brochure, 1994. cited by other.
"Calling Number Identification Service-Caller ID" Federal Communications Commission CC Docket No. 91-281, FCC 95-187. cited by other.
"Caller ID Rises Privacy Issues" Caller-Times Interactive News, Jun. 17, 1996. cited by other.
"Caller-ID With Automatic Name Delivery . . . " ACLU Freedom Network, Feb. 6, 1995. cited by other.
Electronic Privacy Information Center--Style Sheet--Cite as 96 C.D.O.S. 671. cited by other.
"Motorola Cellular Phones to Offer Caller Line ID . . . " Motorola, 1997. cited by other.
"Caller ID Blocking" Apr. 3, 1996. cited by other.
"By the End of 1999, There Will be More Than 130 Million Paging Customers" Communications Daily, Aug. 3, 1994, V14 N149 p. 7(1). cited by other.
Letting Your PC Pick Up the Phone, Popular Science, Mar. 1994, p. 50. cited by other.
"Alphanumeric Paging" Pactel Paging, 1992. cited by other.
"Wireless Phone, Pager Sales to Quadruple to Near $10 Billion" Telephone IP News, Mar. 1994, V5 13. cited by other.
EO Plans Future Devices Despite Current Delays, News Hardware, Mar. 29, 1993, p. 36. cited by other.
"Paging in Russia" Global Communications, May-Jun. 1994, V16 N3. cited by other.
"Casio, Mitsui & Bharti Telecom in Indian Pager Deal" Computergram International, Jul. 12, 1994, I2455. cited by other.
"Price, Branding Play Big Role in Pager Selection, Survey Says" Advanced Wireless Communications, Oct. 26, 1994, V5 122. cited by other.
"Taiwanese Companies Seek to Expand Shares of Chinese Pager Market" Matsushita Weekly, Feb. 10, 1994, V1 16. cited by other.
"Pager Auto-Dial Option" IBM Technical Disclosure Bulletin, Jan. 1994. cited by other.
"Pen-Based Automated Interpersonal Communication System" IBM Technical Disclosure Bulletin, Mar. 1995. cited by other.
Pager Auto-Dial Option, IBM Technical Disclosure Bulletin, Jan. 1994. cited by other.

1994 PCS Market Demand Forecast, Jan. 30, 1995. cited by other.
Identafone Caller ID Software, Sep. 17, 2000. cited by other.
"From Crosswords to Capers, Many APPS to Fill Newton Slot" Macweek, Aug. 2, 1993. cited by other.
"Card Pro Drive Eases PCMCIA Data Transfer to Desktop PCS" Computer Shopper, May 1993, p. 63. cited by other.
Motorola Select 2000 Brochure, 1996. cited by other.
Motorola M75 Digital Cellular Telephone Brochure, 1997. cited by other.
The Wireless Vision--From Motorola Annual Report. cited by other.
"Low-Priced Cellular Plans" Mobile Office, 1993. cited by other.
Let Your PC Page you. cited by other.
"Inside This Guide" PCWorld, Dec. 1992, p. 237. cited by other.
"Multitasking Phone Organizer" Mobile Computing & Communications, Dec. 1998, p. 34. cited by other.
Motorola Tenor Brochure, 1996. cited by other.
Multi-Line Telephone Monitor With Dial Log Brochure by Voice Data Systems, Inc. cited by other.
Motorola Press Release: Motorola Introduces Full-Featured 28.8 VoiceSurfr, Jun. 6, 1996. cited by other.
Paging and Messaging Products From Motorola Website, 1996. cited by other.
"New Caller ID Software Captures Names as Well as Phone Numbers" DM News, vol. 12, No. 20, Jun. 14, 1990. cited by other.
Ameritech and Motorola Bring ISDN to Home Professionals, ISDN News, Jan. 17, 1995. cited by other.
Mediacom.TM. Software the Personal Communications Center, Bellcore, Undated, pp. 4, possibly circa Oct. 1994. cited by other.
Motorola Select 2000 Brochure, 1996. cited by other.
Motorola Tenor Brochure, 1995. cited by other.
Motorola Star TAC Brochure, 1997. cited by other.
Motorola Microtac Elite Brochure, 1996. cited by other.
Skytel 2-Way Booklet by Skytel, 1995. cited by other.
"Go Wireless" Brochure by Skytel, 1994. cited by other.
Sktel Palmtop Messanger Brochure by Skytel Corp., 1995. cited by other
The Wizard OZ-9520FX Brochure by Sharp. cited by other.
The Wizard OZ-5500 Brochure by Sharp. cited by other.
Solocall Smart Center Brochure by Solopoint, 1996. cited by other.
"The Enhanced 911 System At Work" Telident. cited by other.
Voice Organizer Pager Owner's Manual by Voice Powered Technology, Inc., 1996. cited by other.
U.S. Robotics Sportster Voice 28.8 Faxmodem, CMP Media, Inc., 1996. cited by other.
Zeus Phonestuff-Caller ID Products Brochure, 1995. cited by other.
The YO YO Caller ID and Xtension, Sep. 17, 2000. cited by other.
"Zeus'Whozz Calling Caller ID Box" Computer Telephony Magazine, Nov. 1995. cited by other.
"YO YO Adds Text-to-Speech Caller ID" Newsbytes News Network, Sep. 30, 1996. cited by other.
YO YO User's Guide for Windows 95. cited by other.
LG IPC-1000 by LG Electronics, Inc. Brochure, Jan. 1997. cited by other.
Kyocera QCP 6035 User's Guide, 2000. cited by other.
"Wireless PDA COM" PC Magazine, Jun. 27, 2000, p. 98. cited by other.
"Wireless Data Transmission: Practical, Reliable, but not Cheap" Microtimes, Jul. 26, 1993. cited by other.
Caller ID-to-DTMF Conversion, 1995. cited by other.
Company Info: Fanstel--#1 Caller ID World Wide. cited by other.
"Caller ID and Screen Popping for the Pizza Parlor" Telcomp, Inc. 1996. cited by other.
Telcomp, Inc. Caller ID Computer Telephony Integration Home Page, 1996-2001. cited by other.
My Vcaller ID Alpha 1.2X, Nov. 20, 1999. cited by other.
Caller Eyedee News, Feb. 2, 2001. cited by other.
"Pagers Grow More Popular in the Information Age" Philadelphia Business Journal, Feb. 4, 1994, V12 N49 p. 3B(1). cited by other.
"Europe-Wide Paging" Global Communications, Mar.-Apr. 1991, V13 N2 p. 27(5). cited by other.
"The International Growth of Paging" Global Communications, May-Jun. 1993, V15 N3. cited by other.
"IBM Ready to Enter Field of 'Caller ID' Phone Systems" for Your Reference, May 2, 1989. cited by other.
"Practical Multimedia Telephone Service-Today" Bellcore Exchange, Feb. 1994. cited by other.
PC Caller ID 32 Help, Version 1.2, Nov. 1998. cited by other.
"Opening PBX Doors" BYTE, Mar. 1996. cited by other.
"Have Hypercard Call a Pager" Comm Progs/Utils, Mar. 27, 1990. cited by other.
"Pagenow! 1.5-Message Mac to Pagers!" Comm Progs/Utils, Oct. 17, 1995. cited by other.
Handipage by Panisonic. cited by other.
"Prometheus Intros Comms & Multimedia Products" Newsbytes News Network, Jun. 21, 1995. cited by other.
Facsimile Publishing Service Using Radio Signals Planned, Fax-Max Services, possibly circa 1990-1991. cited by other.
"Paging (Broadcast)" Inc., Jun. 1993. cited by other.
"Mobilecomm Slates New Pager for Retail" The Weekly Home Furnishings Newspaper, Oct. 12, 1992, p. 250(1). cited by other.
"Paging Firms Scramble as Cellular Gains" The Wall Street Journal, Nov. 20, 1990, p. B1(2) p. B1(E) col. 3. cited by other.
Voice Recognition Diary Brochure by Parrot. cited by other.
Palm Connect Brochure by Palm Computing, Inc., 1993. cited by other.
"Networking, Wireless Communications" PC Magazine, Aug. 1993, pp. 362-384. cited by other.
"Because Every Message is Important" Pactel, Paging, 1992. cited by other.

Imagine how far you Could go Without Limits. cited by other.
Beam Link Advertisement, JP Systems, Inc.--Pen Computing Magazine, Dec. 1998. cited by other.
"The Information Skyway is Coming Soon to a Wireless Device Near you" Popular Science, Nov. 1995, p. 57. cited by other.
"Wireless Ways" PDA Developers 3.1, Jan./Feb. 1995, pp. 5-6. cited by other.
"Wireless Watch" PDA Developers 3.5, Sep./Oct. 1995, p. 4. cited by other.
"Desktop Communications Made Easty (Part 1)" PDA Developers 3.5, Sep./Oct. 1995, pp. 23-28. cited by other.
Prototype and Design, Sep.-Oct. 1992LE Newton GPS. cited by other.
Cellular Carriers Issue Specs For Enhanced Data Networks, Wednesday Jul. 21, 1993. cited by other.
Atari Portfolio, First Palmtop 1989. cited by other.
Windows CE Computers, Mar. 1993, Pulsar Was A Second Attempt. cited by other.
AT&T EO, Available Since Apr. 1993, Jul. 30, 1993. cited by other.
Your Personal Digital Assistant, Popular Science, Sep. 1992. cited by other.
Method for Assigning Message Numbers and Sorting Numeric Canned Messages, Mar. 1993. cited by other.
Timeline, Newton Connection, PC Connection, Sep. 1993. cited by other.
Computers Without Keys, Popular Science, Aug. 1990. cited by other.
Applecare Archive: Document, Messagepad 120: Upgrading German MessagePad 120 in U.S., Jun. 5, 1996. cited by other.
AppleCare Knowledge Archive: Results, This Message Describes the Newton Messaging Card, Jul. 29, 1993. cited by other.
Newton Messagepad: List of Accessories Available, Applecare Archive: Document, Kbase Document 18814, Jan. 23, 1998, pp. 1-6. cited by other.
Firm Unveils 1.sup.st Personal Communicator, Google.com, Nov. 4, 1992. cited by other.
Developers Line Up to do PDA Hookups, Google.com, Jun. 8, 1992. cited by other.
Pen-Based Automated Interpersonal Communication System, IBM Technical Disclosure Bulletin, Mar. 1995. cited by other.
Motorola's Micro Digital Elite.TM. Cellular Telephone Debuts at 1994 Summer Consumer Electronics Show, Motorola, Libertyville, IL, Jun. 23, 1994, 3 pages, printed Apr. 14, 2002. cited by other.
Charny, Phones getting cozy with photos, CNET News.com, Oct. 17, 2002, 3 pages. cited by other.
Camera phone set to become commodity, but usage still too low, Telecom.paper, Houten, The Netherlands, Jul. 5, 2004, 4 pages. cited by other.
Mobile messaging market overview, Chapter 1, Baskerville Executive Briefing Mobile Messaging Update--Statistics and Data, undated, 3 pages. cited by other.
Telephones: Northern Telecom's Cordless Caller ID Phone Named Product of, Cambridge Telecom Report, from www.highbeam.com, Dec. 12, 1994, 3 pages. cited by other.

Nonam, GSM and PCS1900 Digital Cellular Phones, Mitsubishi i Electric ADVANCES, Sep. 1998, 3 pages. cited by other.
Carroll, PicturePhone (Video Phone)-Ahead of It's time--Another Bell Labs innovation!, Record, May/Jun. 1969, 24 pages. cited by other.
Chakarborty, The Interworking Approach for Narrowband Access to ATM Transport-Based Multiservices Mobile Networks, IEEE Personal Communications, Aug. 1998, 12 pages. cited by other.
Elstrom, Hello, Internet, Businessweek, May 3, 1999, 6 pages. cited by other.
Hanzo et al., Burst-By-Burst Adaptive Wideband Wireless Video Telephony, Dept. Of Electr. and Comp. Sc., Univ. Of Southampton, 18 pages. cited by other.
Wireless Multimedia Messaging Tomorrow's Killer Application, Wireless Developer Network--Daily News, Apr. 9, 2001, 3 pages. cited by other.
When will video be delivered to my phone?, Northstream, Sep. 2001, 7 Pages. cited by other.
MediaQ and SANYO Demonstrate Video Camera Solution for Handheld Computers And Mobile Phones, Wireless Developer Network--Daily News, Dec. 6, 2001 3 Pages. cited by other.
COMPUTERWIRE, J-Phone claims 1m video messaging subs, The Register, Feb. 2002, 2 pages. cited by other.
Parker, WALT is a Newton VideoPad? (was: What is WALT??), Newton Talk, Oct. 25, 2002, 2 pages. cited by other.
Papageorge, Secrets of the wireless elite: Video for handsets, www.ibm.com, Jun. 6, 2003, 6 pages. cited by other.
Panel Discussion at the Fourth International Symposium on Mixed and Augmented Reality, Hand-Held Augmented Reality, ISMAR, Oct. 7, 2005, 6 pages. cited by other.
Yesterday's tomorrow, today., Modern Mechanix, Dec. 24, 2005, 1 page. cited by other.
News Release, Glenayre's Versera Video Solutions and Active Messaging Capability to be Highlighted at CTIA Wireless 2006, Glenayre, Mar. 31, 2006, 2 pages. cited by other.
Phonotelephote, Technovelgy.com, 1889, 1 page. cited by other.
SK Telecom and Thin Multimedia Team to Launch Wireless Video Messaging Service, www.mobic.com, Oct. 24, 2001, 2 pages. cited by other.
Edison's Telephonoscope, www.terramedia.co.uk, Dec. 9, 1878, 2 pages. cited by other.
www.terramedia.co.uk, Mar. 1, 1936, p. 2. cited by other.
"Newton MessagePad," www.msu.edu, Mar. 21, 2002, 5 pages. cited by other.
"Motorola Rings in 1995 with the Launch of the Marco.RTM. Wireless Communicator," www.motorolla.com/General/Events/Comdex/Fall95/Press, 4 pages. cited by other.
"Sony's Magic Link--First Impressions," PDA Developers, Nov./Dec. 1994, 3 pages. cited by other.
"Motorola's Envoy First Run to Magic Cap," www.byte.com, May 1994, 9 pages. cited by other.

"EO Personal Communicator," David Tebbutt, Personal Computer World, www.presshere.com, Feb. 1993, 4 pages. cited by other.
"Simonizing the PDA," Chris O'Malley, www.byte.com, Dec. 1994, 8 pages. cited by other.
"Digital Ink-Introducing the Zaurus," wwww.parra.com, printed Apr. 9, 2002, 5 pages. cited by other.
"Microsoft Windows CE: History and Design," Robert O'Hara, Handheld Systems, Jan./Feb. 1997, 3 pages. cited by other.
"Connecting and Using the Newton Keyboard," Apple Computer, Inc., 1995, 3 pages. cited by other.
"Nokia News: Nokia pioneers new product category with the world's first all-in-one communicator," www.nokia.com, printed Apr. 12, 2002, 2 pages. cited by other.
"Electronic organizer links to your computer," www.cnn.com, Apr. 4, 1996, 2 pages. cited by other.
"AT&T provides email and fax capabilities for Sharp Zaurus K-PDA," ATT&T News Release, www.att.com, Dec. 15, 1994, 2 pages. cited by other.
"Firm Unveils 1.sup.st 'Personal Communicator,'" The Washington Post, Nov. 4, 1992, 3 pages. cited by other.
"Getting Organized with PIMs," www.smartcomputing.com, Jan. 1993, vol. 4, Issue 1, 10 pages. cited by other.
"Technology in Reverse," Robert J. Samuelson, Newsweek, Jul. 20, 1992, 2 pages. cited by other.
"Intellect," brochure: Innovad Innovated Development and Manufacturing, Rev. DEC. 1993, 4 pages. cited by other.
"Make Way for the HPCs: Compaq's PC Companion," Richard orochove, www.morochove.com, Jan. 9, 1997, 2 pages. cited by other.
Sprint Alleviates Manually Creating and Managing Wireless Phonebooks with New Sprint PCS Contact Synchronization Software (SM), Press Release, www.biz.yahoo.com, Feb. 14, 2002, 3 pages. cited by other.
"Personal Digital Assistants," .COPYRGT. Mercury Communications Ltd--Nov. 1993, www.gare.co.uk, 9 pages. cited by other.
"Comdex- Sharp Intros 'Personal Information Assistant,'" Grant Buckler, Newsbytes News Network, Nov. 17, 1993, eLibrary, 1 page. cited by other.
1994 Sony Magic Link, 1 page. cited by other.
1995 Apple Newton with Connecting Keyboard, 1 page. cited by other.
"Take a Peek at the Future . . . Then Program it," 2002 Sprint PCS Application Developer's Conference, http://devcon.sprintpcs.com, 1 page. cited by other.
Sprint Communications Company, L.P., Government Systems Division product authorization, questions/comments page, and "Sprint Announces Second Quarter Results," 9 pages. cited by other.
"Sprint, wireless arm soar on results," Jeffry Bartash, www.marketwatch.com, Apr. 16, 2002, 4 pages. cited by other.
"Sprint PCS posts operating profit, lures customers," Yukari Iwatani, Reuters Business, http://biz.yahoo.com, Apr. 15, 2002, 3 pages. cited by other.
"Sprint Announces First Quarter Results," Press Release, http://biz.yahoo.com, Col. 8, line 50, claim 1 should read:
1. A wireless portable communication device, comprising:
a cellular telephone adapted to receive a picture message from a message center over a wireless connection, the message including a non-facsimile picture supplied by the message originator and a caller ID automatically provided by a communications network that identifies the telephone number of the message originator, said cellular phone having a display and a controller that enables the display of the picture and caller ID on the display.